(12) United States Patent
Ziada

(10) Patent No.: US 12,467,429 B2
(45) Date of Patent: Nov. 11, 2025

(54) HYDRO-MECHANICAL ENERGY TRANSFER SYSTEM WITH DYNAMIC WATER TANKS AND TURBINE GENERATOR

(71) Applicant: Ramadan Ziada, Ramallah (PS)

(72) Inventor: Ramadan Ziada, Ramallah (PS)

( * ) Notice: Subject to any disclaimer, the term of this patent is extended or adjusted under 35 U.S.C. 154(b) by 0 days.

(21) Appl. No.: 18/594,583

(22) Filed: Mar. 4, 2024

(65) Prior Publication Data

US 2024/0200539 A1 Jun. 20, 2024

Related U.S. Application Data

(63) Continuation-in-part of application No. PCT/TR2022/051085, filed on Oct. 4, 2022.

(30) Foreign Application Priority Data

Oct. 11, 2021 (TR) ................................ 2021/015831

(51) Int. Cl.
| | |
|---|---|
| *F03B 17/00* | (2006.01) |
| *F03B 3/02* | (2006.01) |
| *F03B 17/04* | (2006.01) |
| *F03G 3/00* | (2006.01) |

(52) U.S. Cl.
CPC .............. *F03B 17/005* (2013.01); *F03B 3/02* (2013.01); *F03B 17/04* (2013.01); *F03G 3/094* (2021.08); *F05B 2220/32* (2013.01); *F05B 2220/706* (2013.01)

(58) Field of Classification Search
CPC ............................... F03B 17/005; F03B 17/04
See application file for complete search history.

(56) References Cited

U.S. PATENT DOCUMENTS

| | | | |
|---|---|---|---|
| 4,083,186 A * | 4/1978 | Jackson, Sr. .......... | F03B 13/187 60/486 |
| 9,847,696 B2 * | 12/2017 | Karousos ............. | H02K 7/1807 |
| 9,926,905 B2 * | 3/2018 | Fernandez ............. | F04D 25/02 |
| 10,801,476 B2 * | 10/2020 | Ekanem ................... | F03G 3/00 |
| 2005/0052028 A1 * | 3/2005 | Chiang ................ | F03B 17/005 290/1 R |

(Continued)

FOREIGN PATENT DOCUMENTS

| | | |
|---|---|---|
| EP | 2381089 | 10/2011 |
| WO | 2019098997 | 5/2019 |

OTHER PUBLICATIONS

The International Search Report Dated Jan. 30, 2023.

(Continued)

*Primary Examiner* — Thomas E Lazo
(74) *Attorney, Agent, or Firm* — Preston Smirman; SMIRMAN IP LAW, PLLC

(57) ABSTRACT

A mechanical machine containing water in three tanks in its entirety, represented by a tank fixed at the top of the machine and not moving, and a tank moving up and down in the middle of the machine, and a tank moving up and down at the bottom of the machine. The movement of the middle and lower tank periodically tries to transfer water to the upper tank through five stages through its interaction with the remaining main parts of the machine (for example, gas springs, large water injections and automatic mechanical braking system).

13 Claims, 22 Drawing Sheets

(56) References Cited

U.S. PATENT DOCUMENTS

| | | | |
|---|---|---|---|
| 2011/0126538 A1* | 6/2011 | Kim | F03G 7/104 |
| | | | 60/639 |
| 2013/0019971 A1 | 1/2013 | Anteau | |
| 2015/0130192 A1* | 5/2015 | Palani | F03G 7/10 |
| | | | 290/1 A |
| 2018/0149131 A1* | 5/2018 | Alkhars | F03B 15/16 |
| 2018/0355838 A1* | 12/2018 | Mueller | F03B 17/005 |
| 2020/0208615 A1 | 7/2020 | Ekanem | |

OTHER PUBLICATIONS

Written Opinion of the Iinternational Searching Authority Dated Jan. 30, 2023.
The International Preliminary Report on Patentability Dated Jan. 24, 2024.
The Annex To the International Preliminary Report on Patentability Dated Jan. 24, 2024.

* cited by examiner

HYDRO-MECHANICAL ENERGY TRANSFER SYSTEM WITH DYNAMIC WATER TANKS AND TURBINE GENERATOR

CROSS-REFERENCE TO RELATED APPLICATION

The instant application is a continuation in part of PCT International Patent Application Serial No. PCT/TR2022/051085 filed Oct. 4, 2022, and claims priority to Turkish Patent Application Serial No. 2021/015831 filed Oct. 11, 2021, the entire specifications of both of which are expressly incorporated herein by reference.

TECHNICAL FIELD

This invention works to generate kinetic energy to power large electrical generators with its kinetic energy. Thus, it is trying to reduce the use of all kinds of fossil fuel-powered engines to run electricity generators, and this includes nuclear stations.

The invention is environmentally friendly (since it relies on the Earth's gravitational energy as the primary source for its operation) and this machine may be placed inside large ships and submarines, in factories, power plants, remote areas and underground, and because it is placed underground, it saves space on land, unlike solar and wind electricity generation systems that work to digest more land area. The presence of this machine under the ground is also caused by natural disasters, wars, etc., it may be used as a strategic protection factor in situations.

It should be noted here that this invention is unique, because the production of this machine for kinetic energy passes through a primary source, which is the gravity of the Earth, since it gives us energy almost free of charge, if we take into account the production costs of the machine and periodical maintenance.

SUMMARY OF THE INVENTION

This invention is a mechanical machine containing water in three tanks in its entirety, represented by a tank fixed at the top of the machine and not moving, and a tank moving up and down in the middle of the machine, and a tank moving up and down at the bottom of the machine. The movement of the middle and lower tank periodically tries to transfer water to the upper tank through five stages through its interaction with the remaining main parts of the machine (gas springs, large water injections and automatic mechanical braking system).

At a time when water is moving and flowing strongly from the top of the upper tank, this flow benefits from the presence of a water turbine in the upper tank at its upper part. Where kinetic energy is generated from a water turbine, and an electric generator is powered by this kinetic energy.

The amount of water in the machine remains constant and moves between the three tanks, taking advantage of the weight of the water when it moves between the tanks moving up and down, and stores lifting and propulsion energy in the gas springs that will lift the middle and lower tank when they move up, and at the same time, the pressure of the water, the continuity of the movement in the machine as will be explained in the detailed summary later.

In accordance with the general teachings of the present invention, a system is provided to generate kinetic energy to power large electrical generators with its kinetic energy. Thus, it is trying to reduce the use of all kinds of fossil fuel-powered engines to run electricity generators, and this includes nuclear stations and its characterized b; the upper tank (11), the middle tank (12), the upper tank funnel (49) and the middle tank funnel (50) made of reinforced plastic to reduce the total weight and production cost of the tank, the drain plug (5) and the lower tank drain plug (6), which are present in the upper tank (11) and middle tank (12) (which open and close depending on the movement of the tanks in the machine cycle), the drain plug fixed to the water tanks and integrated into the automatic brake pedal box in the structure of the machine body (1) upper tank drain plug opening cables (40), which automatically closes it, and middle tank brake release cable (41) and brake pedal release cables (27), the fixed pistons (51) at the bottom of the middle tank and actuating the pistons (7) of large gas springs to press each of: (the water syringes 1 (15.1) and the large gas springs (8), the pistons (52), which, in addition to the pistons, pump water into the water syringes 2 (15.2) and are fixed to the base of the machine (42), the pistons (53) fixed on the body of the machine, which compress the water syringes 3 (15.3) fixed on the body of the machine (1), the water turbine (2) inside the upper tank (11) that help to reduce the sound of the water coming down and facilitate its flow in the tank, the waterway (54), which allows the water coming down from the water turbine (2) body to move inside the upper tank, longitudinally formed the channel path (48) of the manual braking system on both sides of the medium tank (12) and, it includes an automatic braking system containing automatic brake pedal boxes 1 (30) and automatic brake pedal boxes 2 (36) to stop the movement of the medium tank (12) and large gas springs (8).

The structural and characteristic features and all advantages of the product subject to the invention will be understood more clearly thanks to the figures given below and the detailed explanation written by referring to these figures, and therefore the evaluation should be made by considering these figures and detailed explanation.

DESCRIPTION OF THE FIGURES

The invention will be described with reference to the accompanying figures, so that the features of the invention will be more clearly understood and appreciated, but the purpose of this is not to limit the invention to these certain regulations. On the contrary, it is intended to cover all alternatives, changes and equivalences that can be included in the area of the invention defined by the accompanying claims. The details shown should be understood that they are shown only for the purpose of describing the preferred embodiments of the present invention and are presented in order to provide the most convenient and easily understandable description of both the shaping of methods and the rules and conceptual features of the invention. In these drawings.

FIG. 1 (B)—Longitudinal section of the less-simplified prototype design figure.

Figure 1A:
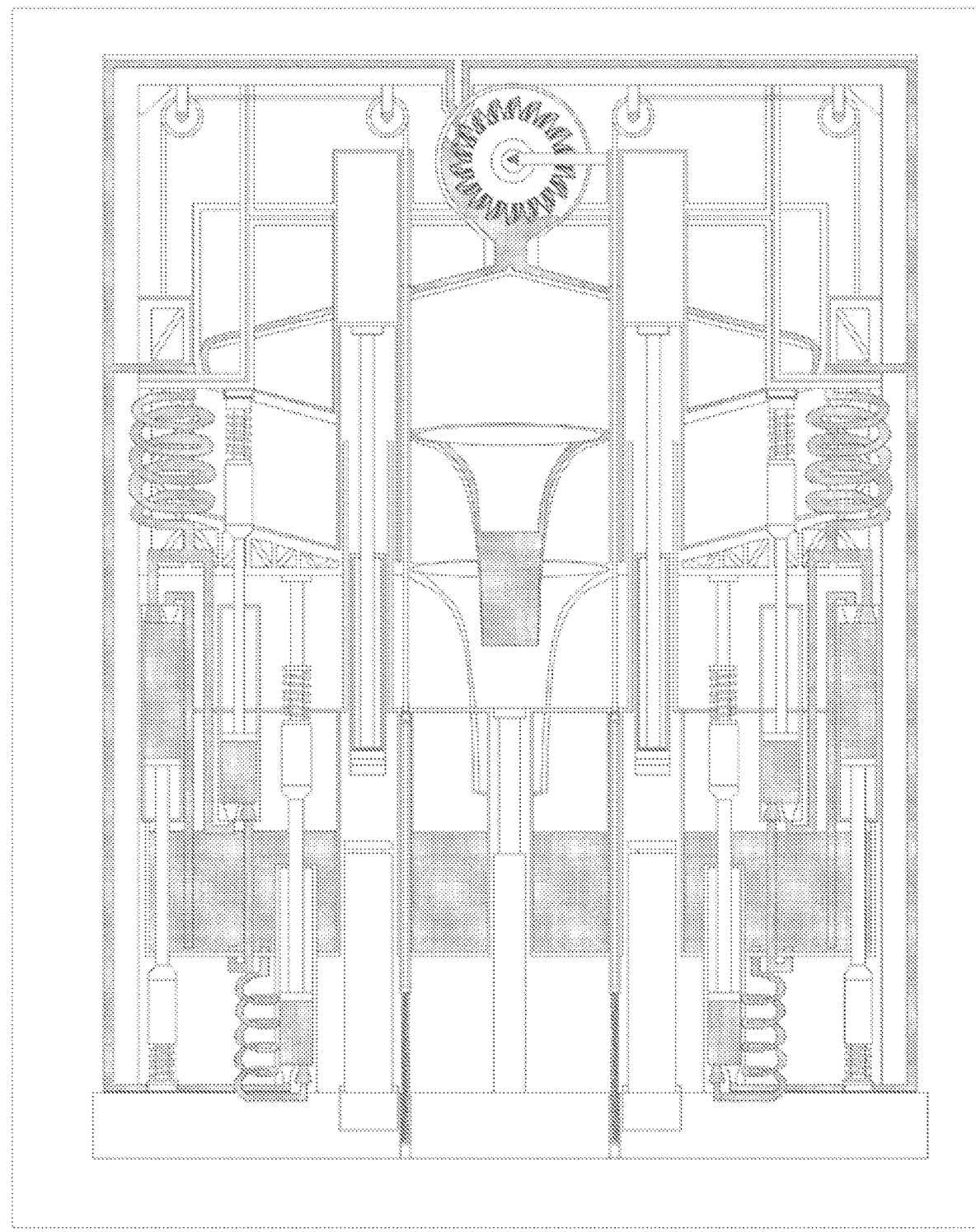
FIG. 1 (A)—Longitudinal section of the prototype design figure according to the invention.

The figures to help understand the present invention are numbered as indicated in the attached image and are given below along with their names.

LIST OF REFERENCE ELEMENTS

Machine structure
Water turbine
Water pipe
Spiral spring water tube
Drain stopper of the upper tank
Drain stopper of the middle tank
Pistons of the large gas springs
The large gas springs
The small gas springs
The main shaft of the water turbine
The upper tank
The middle tank
The lower tank
Coil springs 1
Coil springs 2
Coil springs 3
Water syringe 1
Water syringe 2
Water syringe 3
Suction Valve 1
Suction Valve 2
Suction Valve 3
Outlet Valve 1
Outlet Valve 2
Outlet Valve 3
Pulley
The steel wire ropes
Coil springs for steel wires ropes
The solid cylinder
The box arm
Coil spring 1
Brake pedal
Head of the arm
Key of release the brake pedal lock
Key of the brake pedal return after pressed its
Brake pedal release cable
Brake's jaws
Rail track 1
The boxes of automatic brake pedals 1
Brake pedal release box 1
Brake pedal release box 2
Brake pedal release box 3
Brake pedal release box 4
Manual Brake
The boxes of automatic brake pedals 2
Rail track 2
Braking jaws
The oil pressure brakes piston rod
Cable of opening the upper tank drain stopper
Middle tank brake release cable
The base of the machine
A pipe inside the upper tank
A pipe inside the middle tank
A pipe inside the lower tank
Carrying area of the Middle tank
The common oil pressure tube
Longitudinal canal track
The funnel of the upper tank
The funnel of the middle tank
The fixed pistons under the middle tank
The pistons fixed in the base of the machine
The pistons fixed in the machine's structure
The watercourse inside the upper tank
Coil spring 2
Cables and wires of automatic brake box
Oil pressure tubes
Small pulleys
The brake oil pressure cylinder
The structure of the automatic brake box
Steel beams
Cylindrical iron tube
Solid plastic ball covered with strong rubber
Triangular (internal) coil spring
Direction of water movement
Hole of the one-way valve
Wide slots of cylinder
Layer of reinforced and high-pressure rubber
Layer of a carbon fiber fabric
Layer of a supple plastic cover
Layer of a metal lattice coil spring

DETAILED DESCRIPTION OF THE INVENTION

Part One

Figure 3:
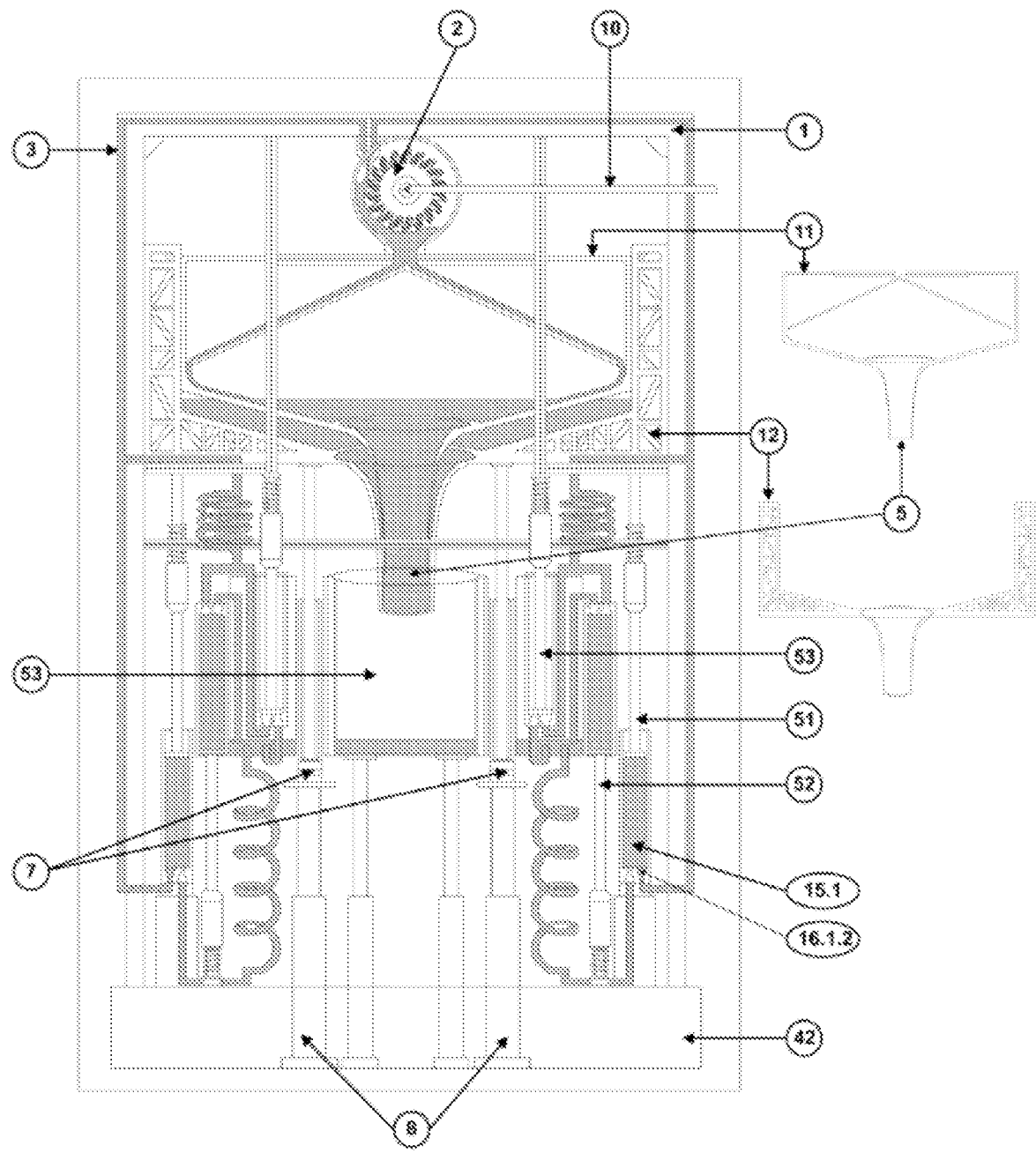
FIG. 3—The first phase of the machine cycle, which is the beginning of the cycle.

This machine depends in its movement on a self-renewing cycle, as it consists of five phases as follows:

1) The first phase: As shown in (FIG. 3), the middle water tank (12) (FIG. 3) is already stop and close fitting to the upper fixed water tank (11) (FIG. 3), the upper tank (11) is open to the middle tank (12) through the Drain stopper of the upper tank (5) (FIG. 3) from down of the upper tank funnel (49), where the water is passed through and transferred from it, that is, the weight of the water is carried by the middle tank (12) in this state, and this is the position in which the machine cycle is in the fifth (last) phase, and from here the manual brakes of the machine (35) (FIG. 12), (FIG. 13) are lowered by hand only once to start the first phase of the machine cycle as follows:

The middle tank (12) begins to go down compressing with it the large gas springs (8) (FIG. 3), through the pistons of the large gas springs (7) (FIG. 3), Also, the water syringe (15.1) (FIG. 3) is compressing at the same time, as these water syringe (15.1) (FIG. 3) push the water to flow up through the valve which designed to extract and pushing water from the syringe (16.1.2) (FIG. 3), then rise through the water pipe (3) (FIG. 3) to the water turbine (2) (FIG. 3) and make it spin, Thus the main shaft of the water turbine (10) (FIG. 3) rotates to produce kinetic energy, whereas drain stopper of the upper tank (5) of the funnel head under the upper water tank (FIG. 3) still open.

Figure 2:
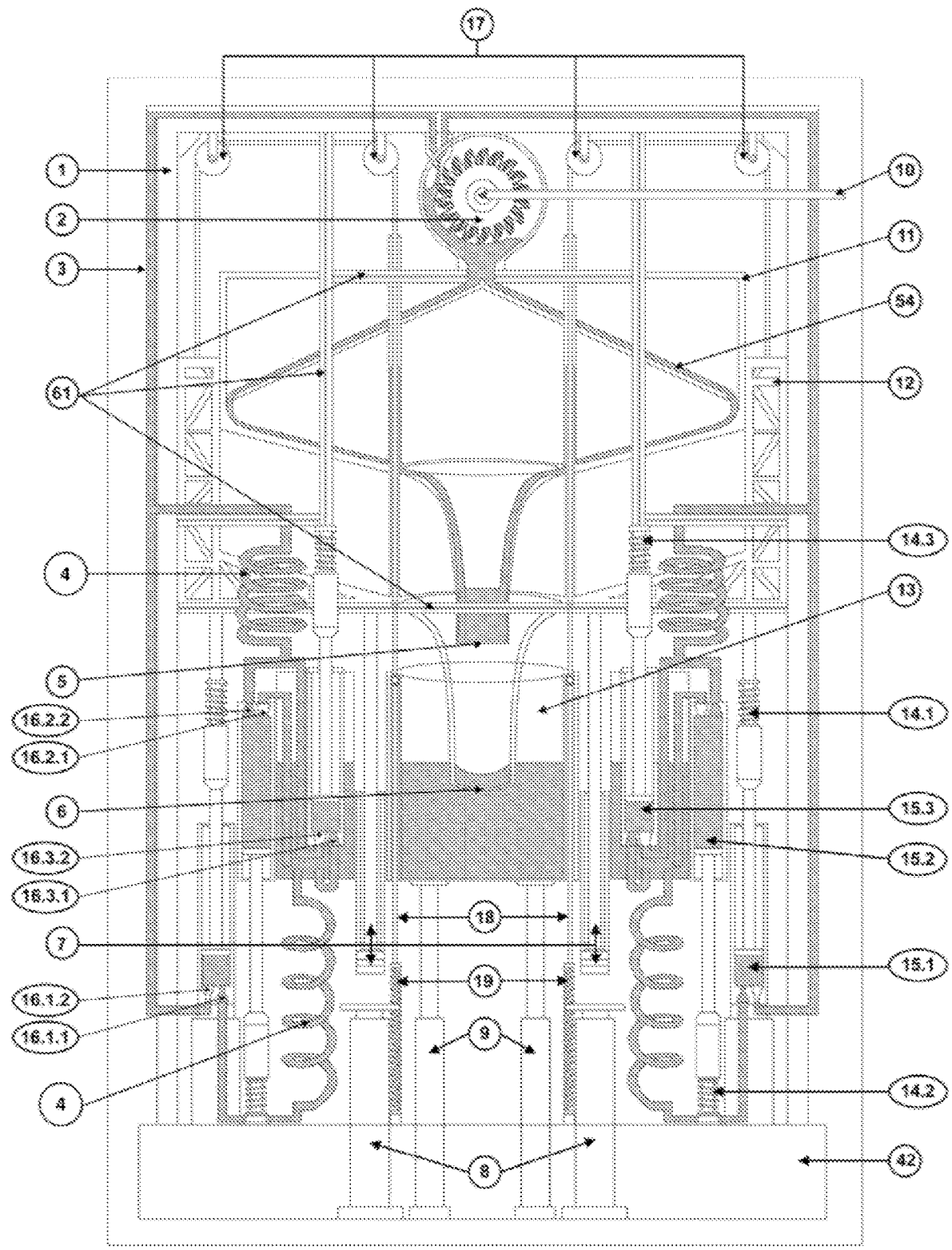
FIG. 2—Longitudinal section illustrating the parts of a machine in a simplified prototype.

2) The second phase: As shown in (FIG. 4), after the arrival of the middle tank (12) (FIG. 4) and attach with the lower water tank (13) (FIG. 4), then the middle tank (12)

stops moving, and the large gas springs (8) (FIG. 2) are braked Automatically, which was compressed in the first phase, and from here the second phase begins as follows:

The drain stopper of the middle tank (6) (FIG. 4) down the funnel opens below the middle water tank automatically so that water flows down into the lower tank (13), and in the same time the water syringe (15.1) (FIG. 4) continues to push the water turbine (2) (FIG. 4) at the top through the output valve (16.1.2) (FIG. 4) the reason for this is: that the water syringes (15.1) is left a small amount of water remaining as shown in (FIG. 4), and therefore the coil springs (14.1) (FIG. 4) on it pushing the remaining of the water in the water syringes (15.1), where the drain stopper of the upper tank (5) (FIG. 4) in the funnel of the upper tank is still open.

The coil springs (14.1) (FIG. 4) are compressed at the beginning of the second phase due to the descent of the middle water tank (12) (FIG. 4) during the first phase.

3) The third phase: As shown in (FIG. 5), after the water is transferred from the middle tank (12) (FIG. 5) to the lower tank (13) (FIG. 5), the lower tank (13) begins to descend and the middle tank (12) goes up, where the weight of the lower tank (13) raise the middle tank (12) due to the weight difference, by the steel cables and pulleys (17) (FIG. 5) installed in the machine frame at the top as shown in, at the same time, the drain stopper of the upper tank (5) (FIG. 5) closes automatically, and the drain stopper of the middle tank (6) (FIG. 5) remains open, the result from each: descend of the lower tank (13), and the rising of the middle tank (12) as follows:

Suction water from the lower tank (13) by water syringes (15.1) (FIG. 5) by the suction valve (16.1.1) (FIG. 5) by the action of the ascending of the middle water tank (12).

Figure 5:
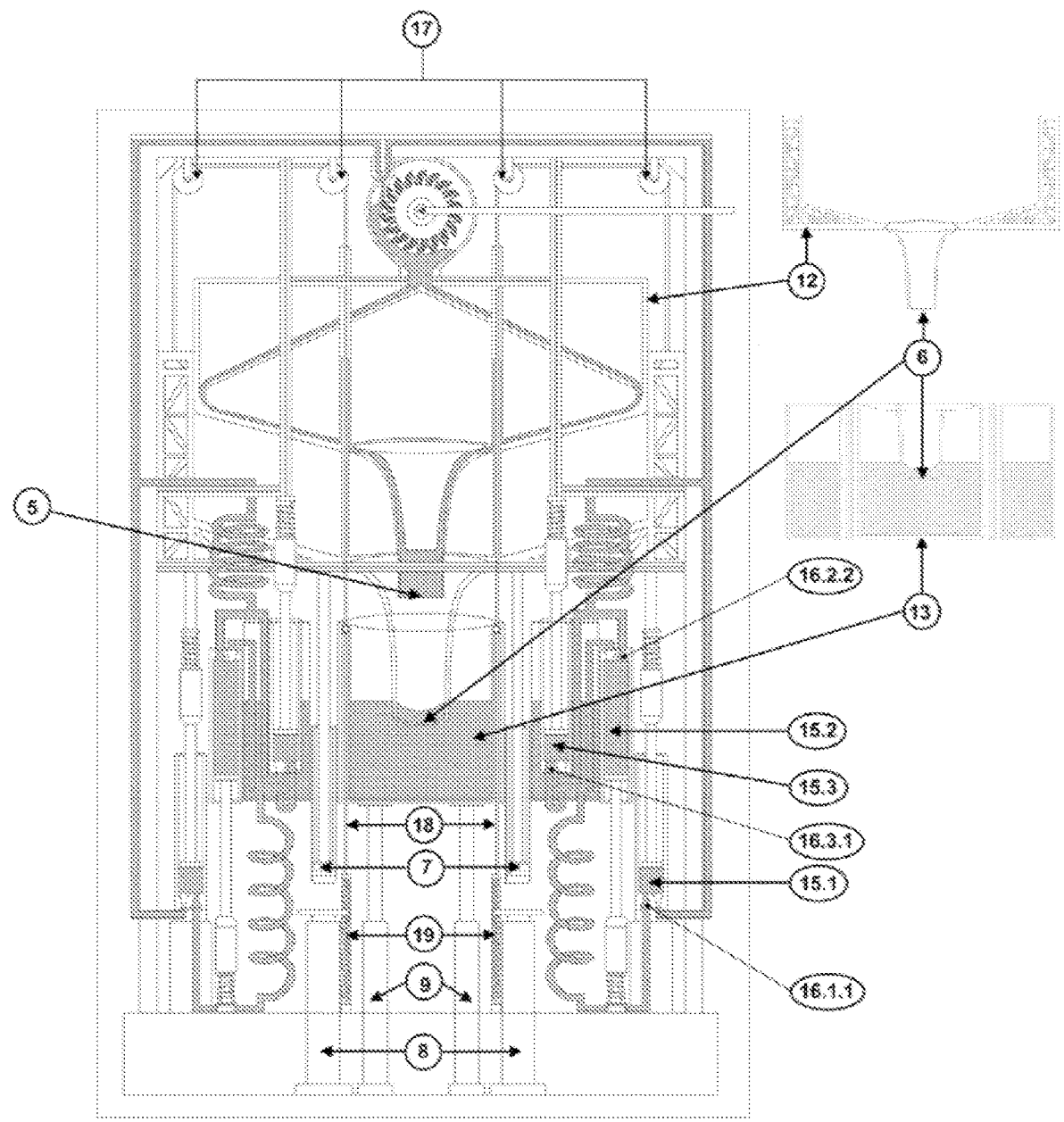
FIG. 5—The third phase of the machine cycle.

Suction water from the lower tank (13) by water syringes (15.3) (FIG. 5) by the suction valve (16.3.1) (FIG. 5) by the movement of the descending of the lower tank (13), and at the same time the syringes (15.2) (FIG. 5) is pushing the water by the output valve (16.2.2) (FIG. 5) to the water turbine at the top of the machine, by the movement of the lower tank (13) downward, where the outer cylinders of the syringes (15.2), (15.3) (FIG. 5) are always fixed around the lower tank (13), also at the same time the lower tank (13) and in its descending movement are working to press the small gas springs (9) (FIG. 5).

The large gas springs (8) (FIG. 5) are remaining brake throughout the third phase, and the pistons of the large gas springs (7) (FIG. 5) rise with the rise of the middle water tank (12); because it is fixed on it.

4) The fourth phase: As shown in (FIG. 6), the middle tank (12) (FIG. 6) is already arrived to the upper tank (11) (FIG. 6) and close fitting on it and automatically braked into the machine structure (1) (FIG. 6), the drain stopper of the middle tank (6) (FIG. 6) is closed automatically at the moment of its arrival to up and, the lower tank (13) (FIG. 6) has reached the bottom and compressed the small gas springs (9) (FIG. 6) without to brake its, and at the beginning of the fourth phase the following occurs:

When the lower tank (13) (FIG. 6) reaches down and touches the large gas springs (8) (FIG. 6), the brakes (30) (FIG. 8), (FIG. 10), (FIG. 12) are removed from the large gas springs (8) (FIG. 6) via the brake pedal release box (31), (FIG. 9B), (FIG. 10), (FIG. 12) of the lower tank movement to begins the lower tank (13) (FIG. 6) rise up through the propulsion energy that has been compressed and stored in the large gas springs (8) and small gas springs (9) (FIG. 6), thus the lower tank (13) (FIG. 6) is easily raised, and in the meantime, i.e. (the rise of the lower tank (13) (FIG. 6)), this tank works to reverse the fixed water syringes movement on it, i.e. (the water syringes (15.3) (FIG. 6)) compresses the water and pushes it into the water turbine (2) (FIG. 6) at the top, through the output valve on the water syringes (16.3.2) (FIG. 6), also reverse the water syringes (15.2) (FIG. 6) movement, where it suction water from the lower tank (13) (FIG. 6) through a suction valve located on the water syringes (16.2.1) (FIG. 6), while the middle tank (12) (FIG. 6) is attached and fixed in the upper tank (11) (FIG. 6), so the water syringes (15.1) (FIG. 6) is still inactive and its valves (16.1), (16.2) (FIG. 6) are closed.

Figure 7:
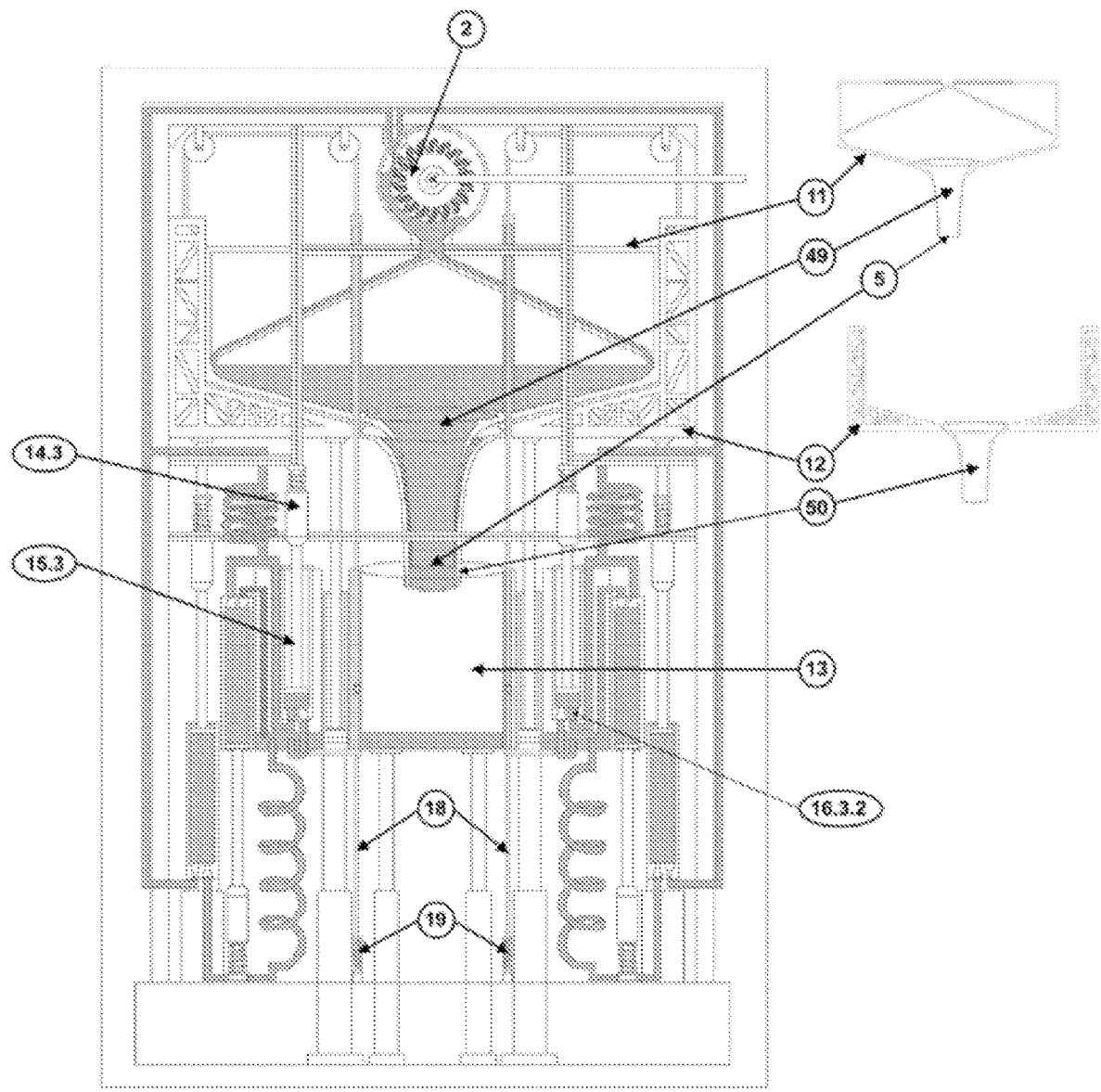
FIG. 7—The fifth phase of the machine cycle, which is the end of the cycle.
Figure 8A:
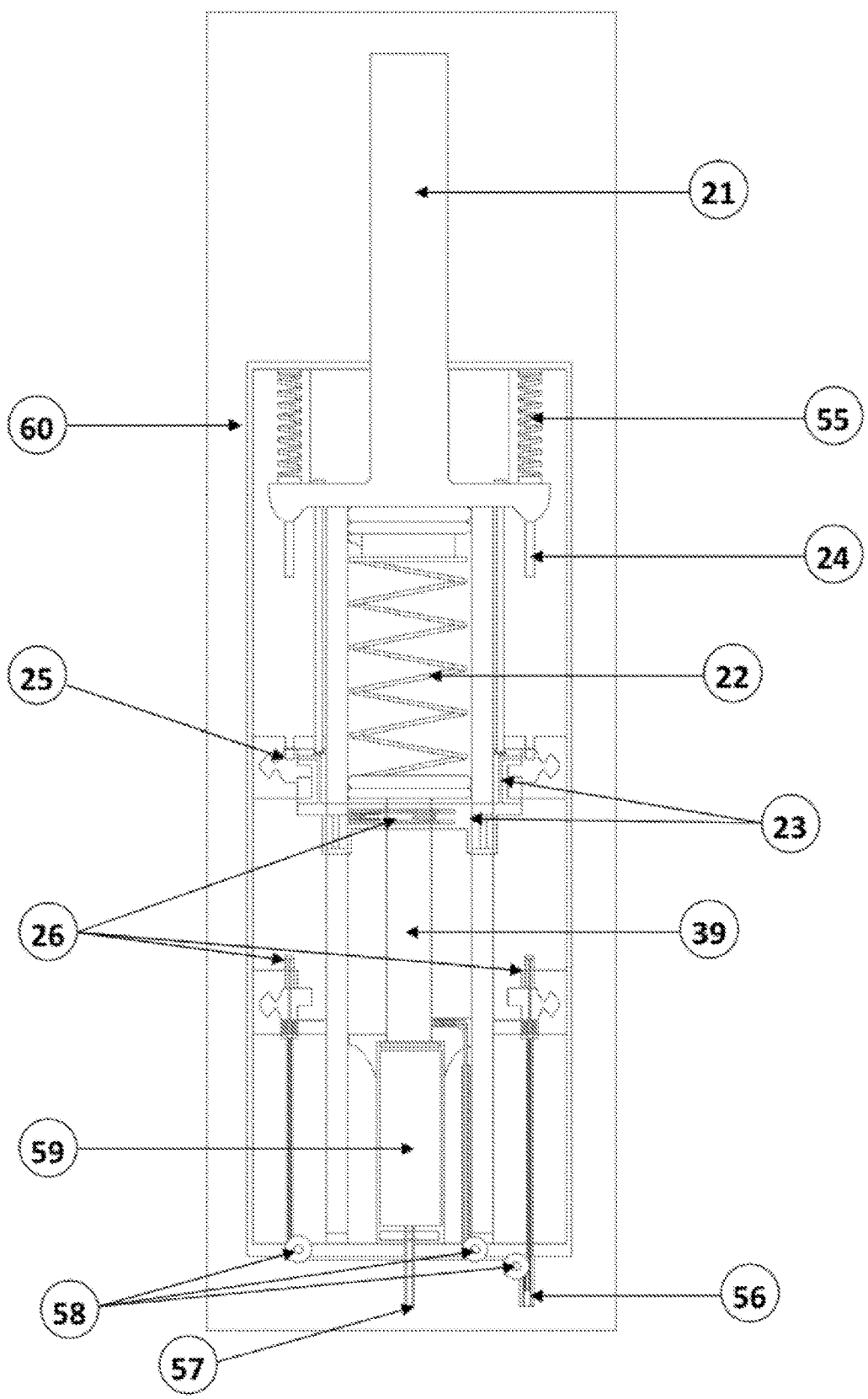
FIG. 8A—Brake system box.
Figure 8B:
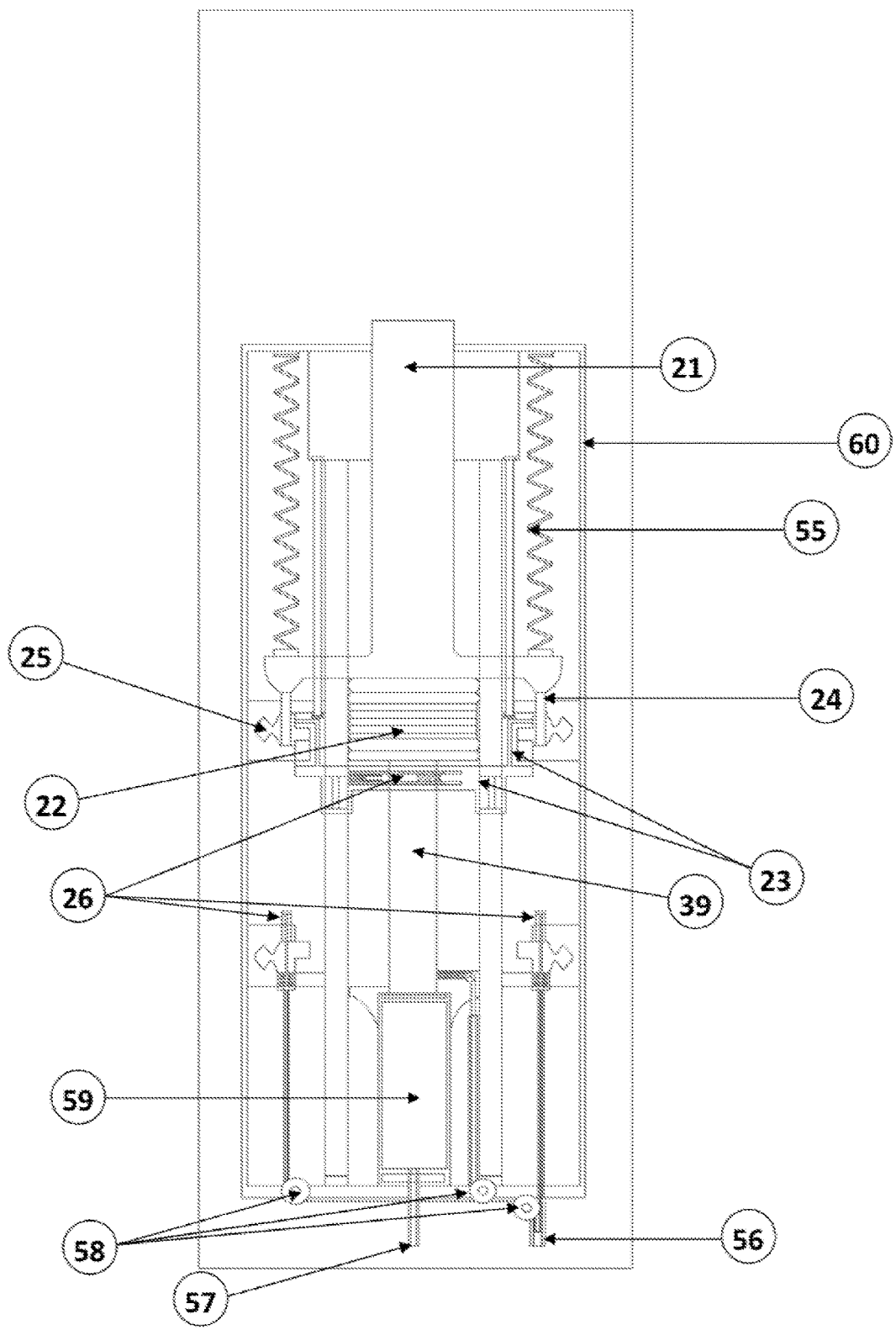
FIG. 8B—Brake system box.
Figure 8C:
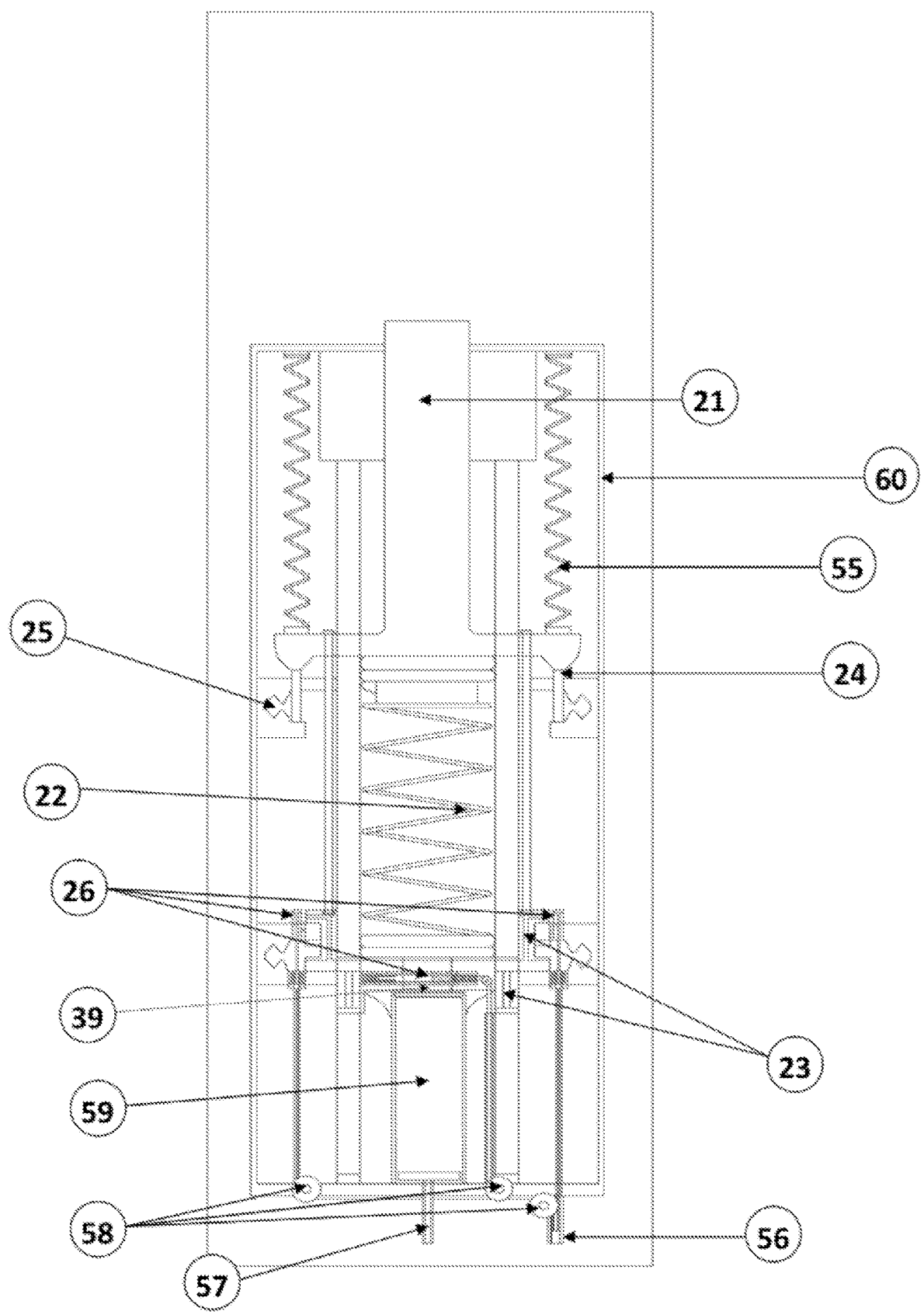
FIG. 8C—Brake system box.
Figure 8D:
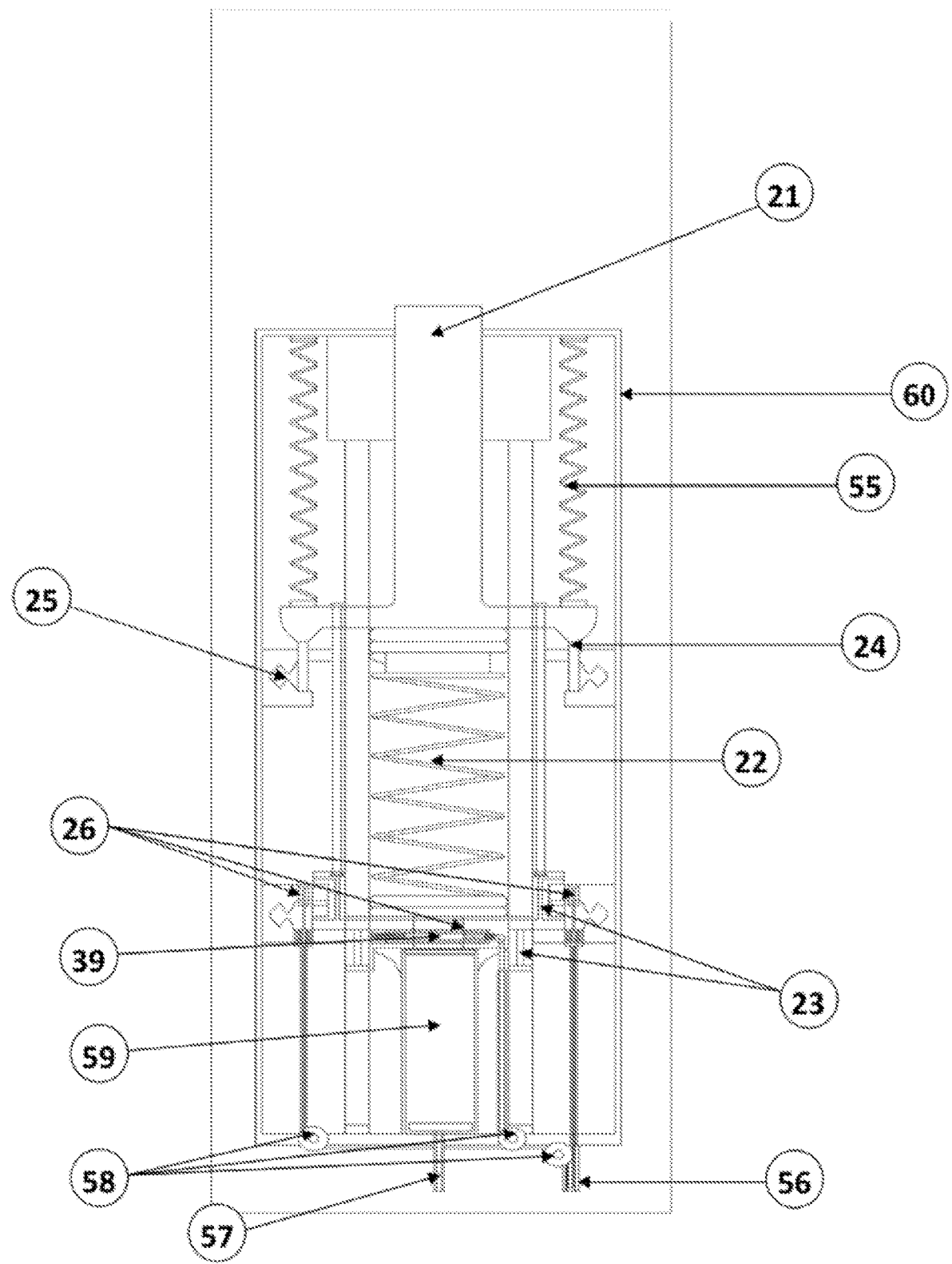
FIG. 8D—Brake system box.
Figure 8E:
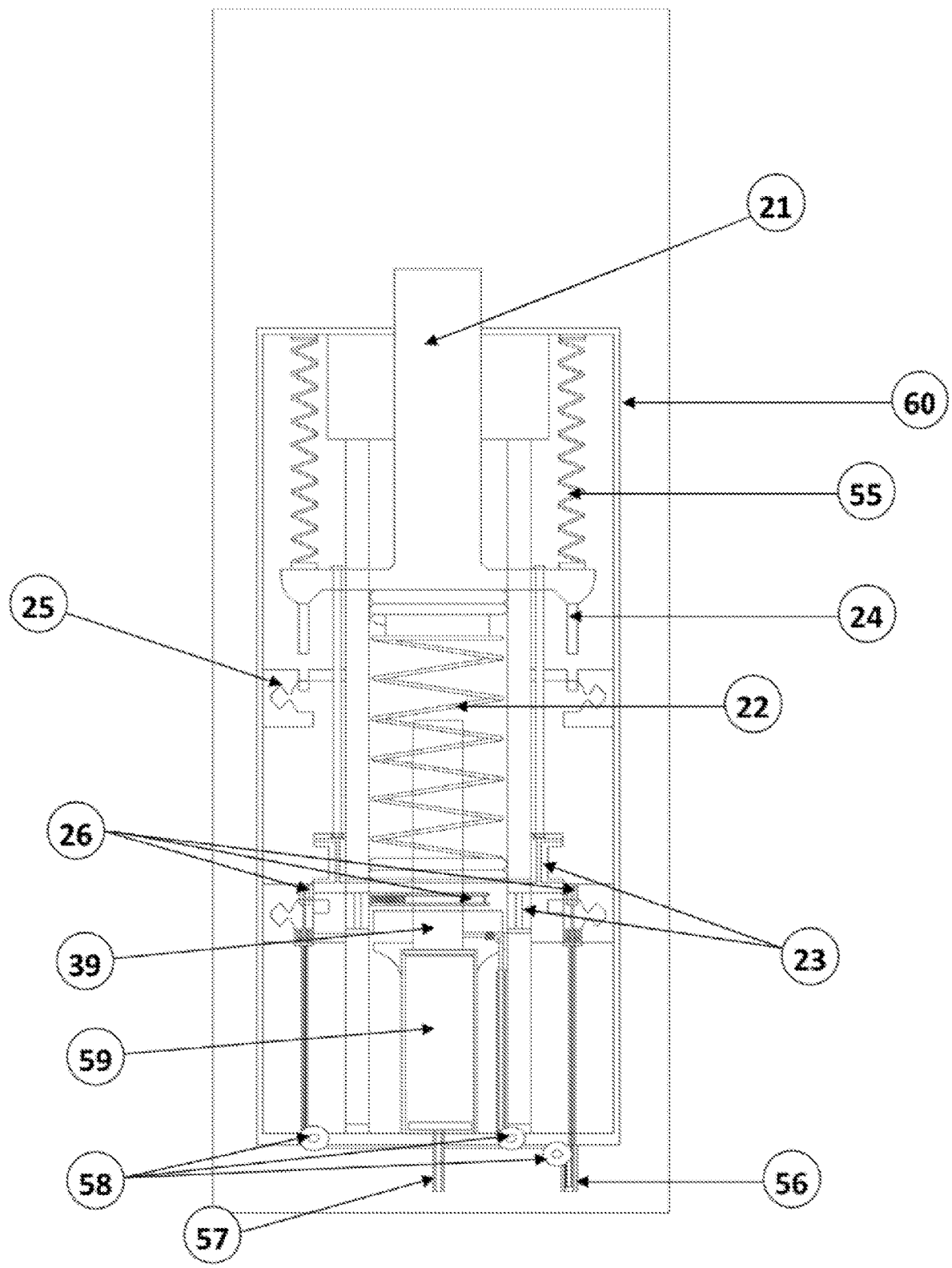
FIG. 8E—Brake system box.
Figure 9A:
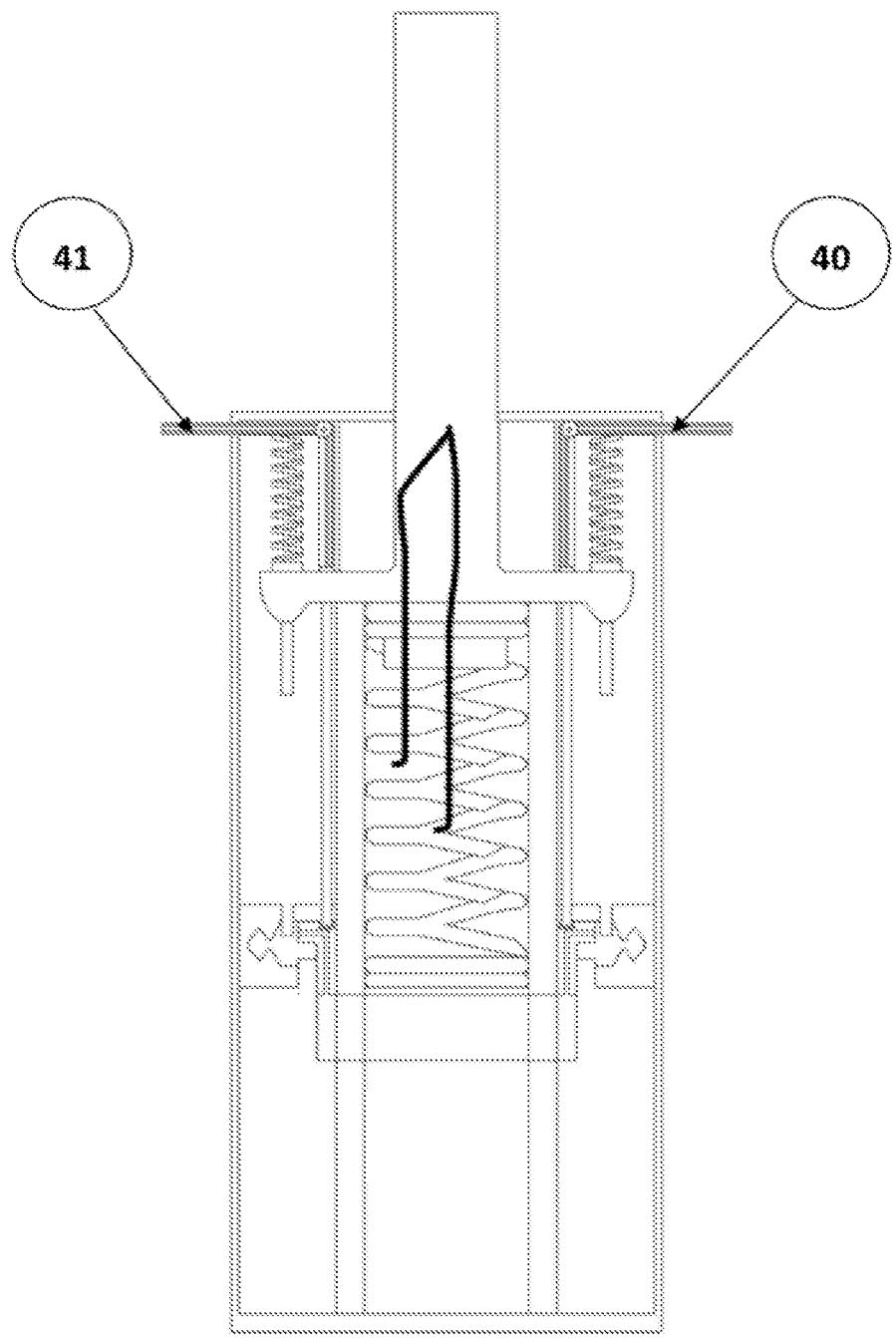
FIG. 9A—Brake pedal release box.
Figure 11:
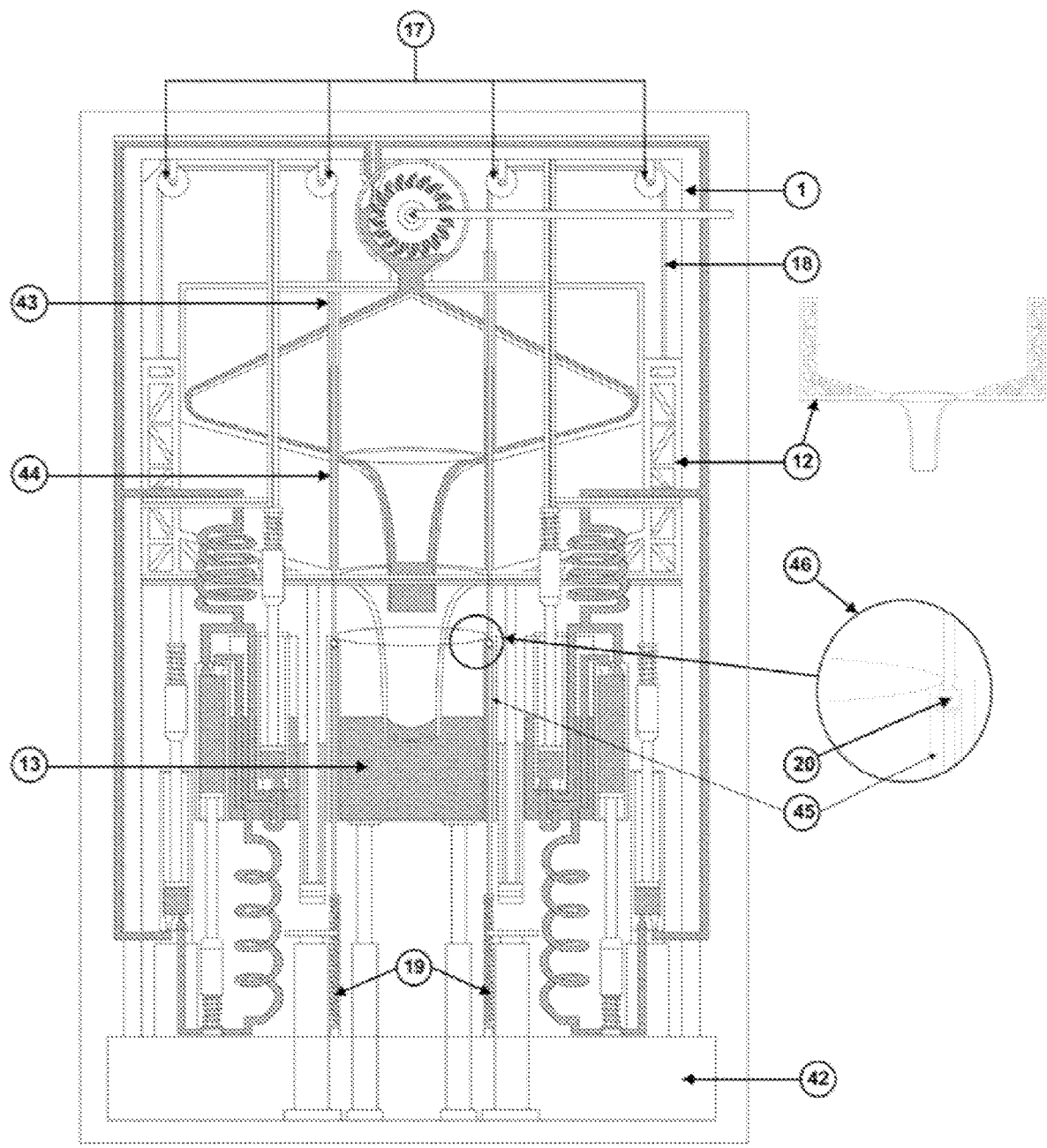
FIG. 11—The middle tank automatic lifting system.

5) The fifth phase: As shown in (FIG. 7), when the lower tank (13) (FIG. 7) returns and reaches its place at the top, (without braking its) and the water is transferred to the upper tank (11) (FIG. 7) where the drain stopper of the upper tank (5) (FIG. 7) it still closed, and at this moment the following occurs:

The drain stopper of the upper tank (5) (FIG. 7) funnel opens via the brake pedal release box (33) (FIG. 9A, upper tank's (FIG. 11) cable), (FIG. 12), and in the same time release down the brakes (36) (FIG. 8) (FIG. 12) of the middle tank (12) (FIG. 7), via the brake pedal release box (33) (FIG. 9A, middle tank's (FIG. 12) cable), (FIG. 12), so that the water moves from the upper tank (11) (FIG. 7) to the middle tank (12) (FIG. 7), and this also means that The weight of the water will be carried by the middle tank (12) (FIG. 7) as in the first phase, Meanwhile, exactly how long it takes for the water to descend and move to the middle tank (12) (FIG. 7), the remaining water in the syringes (15.3) (FIG. 7) are compressing by the output valve (16.3.2) (FIG. 7) to the water turbine (2) (FIG. 7) on top; This is done by the coil springs on water syringe (14.3) (FIG. 7).

After the fifth phase of the machine cycle ends, the first phase begins and so on.

Part Two

Detailed description of the automatic systems in the machine:

1) Automatic brake system for the middle tank (12) and the large gas springs (8), by oil pressure:

First: The middle tank (12) (FIG. 3) brake mechanism, where this system relies on the brake pedal box (36) (FIG. 8), (FIG. 12) and its fixed in the machine structure (1) (FIG. 2), where the box (FIG. 8) contains a special arm (21) (FIG. 8) that is outside of the box as shown in and once the arm (21) (FIG. 8) starts touching the specified place to it on the structure of the middle tank (FIG. 12) (as a result of the rising of the middle tank (FIG. 12)) the arm (21) (FIG. 8) is pressed into the box (FIG. 8) pressing with it the coil spring (22) (FIG. 8), where the coil spring (22) (FIG. 8) is always touched on the pedal (23) (FIG. 8), and the pedal (23) (FIG. 8) is locked before the arm (21) (FIG. 8) reaches its release switch (25) (FIG. 8), and once the arm head (24) (FIG. 8) reaches of the key (25) (FIG. 8) on the pedal (23) (FIG. 8) and this key (25) (FIG. 8) is pressed, the coil spring (22) (FIG. 8) has been pressed to the maximum, and in this moment the brake pedal lock (25) (FIG. 8) is removed due to the pressure of the arm head (24) (FIG. 8) on the brake release key (25) (FIG. 8), thus the coil spring (22) (FIG. 8) presses the pedal (23) (FIG. 8) quickly and completely, so it's brake the movement of the middle tank (12) by pressing the brake's jaws (38) (FIG. 13) on the middle tank's rail track (37) (FIG. 13) through the common oil pressure tube between the middle tank brake and the hand brake (47) (FIG. 13).

As for the release the brake pedal of the middle tank (23) (FIG. 8) through the releasing key of the brake pedal (26) (FIG. 8) it's by the movement of the lower tank (13) (FIG.

7) up at the end of the fourth phase, where there is a box to release the brakes (FIG. 9A, the middle tank's (Pt. 12)) cable, where that box (33) (FIG. 12) fixed on the machine structure as shown in, and in this same box and at the same time that releasing the pedal of the middle tank brake (23) (FIG. 8), the drain stopper of the upper tank (5) (FIG. 7) opens via the brake pedal release box (FIG. 9A, the upper tank's (11)) cable.

Figure 9B:
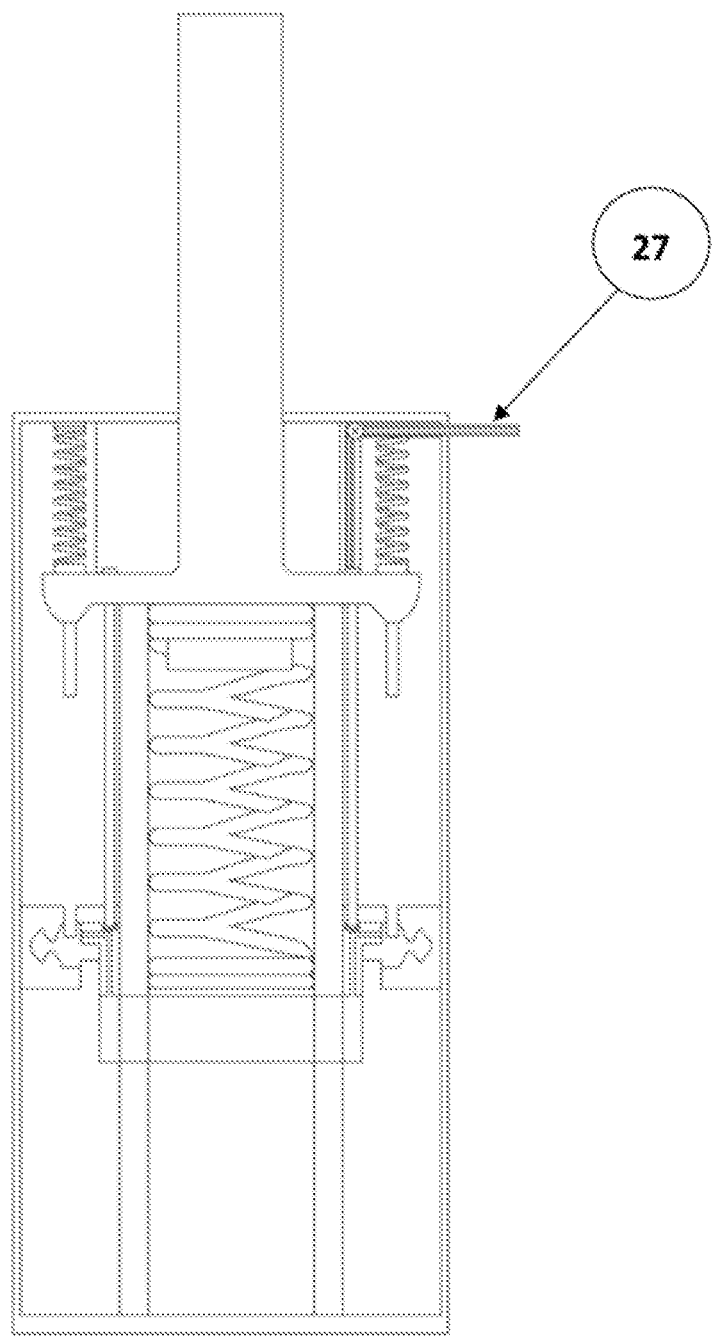
FIG. 9B—Brake pedal release box.
Figure 10:
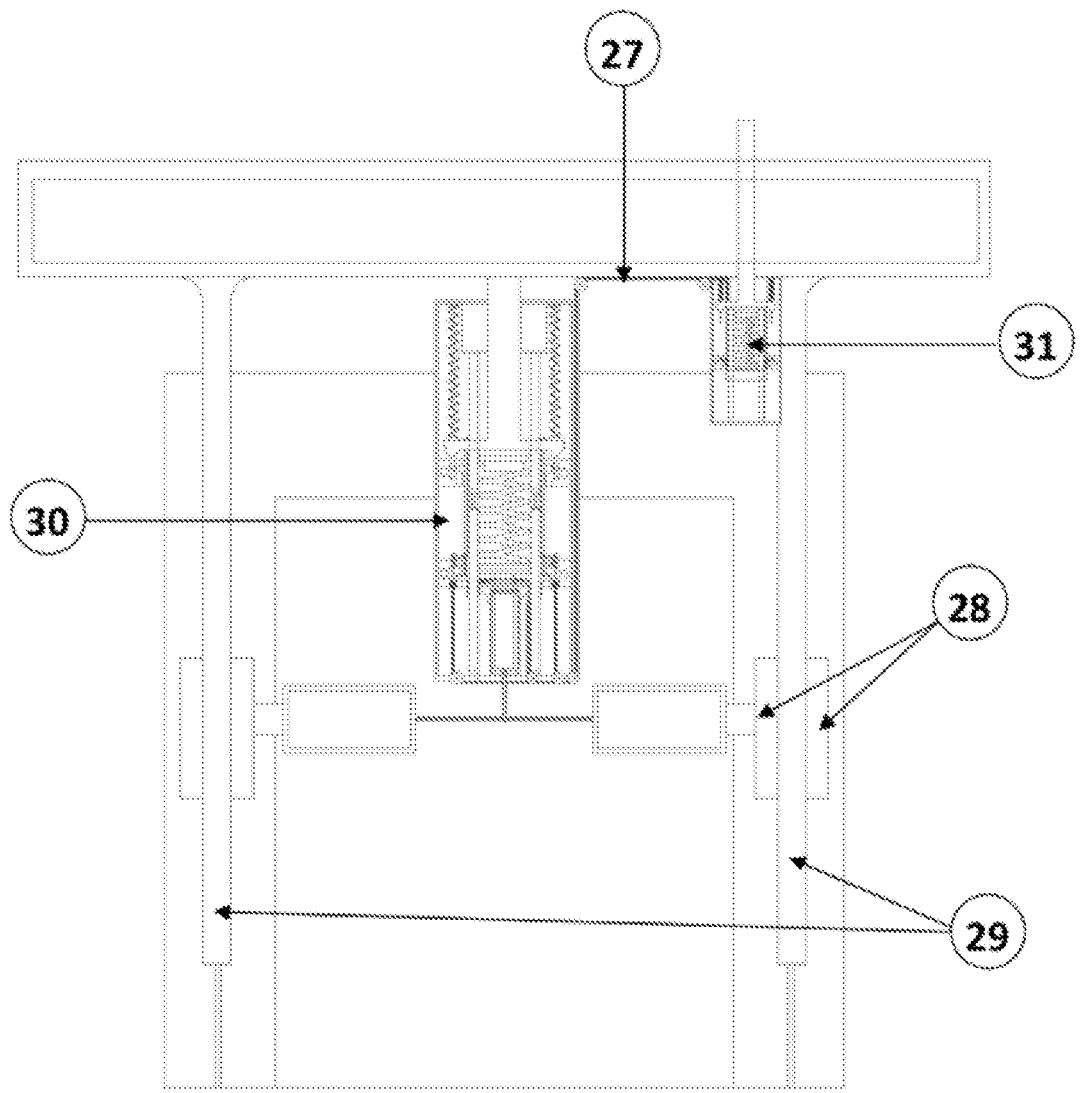
FIG. 10—Self-braking system for the large gas springs.

Second: The system of brake the large gas springs:

This system relies on two boxes for the braking process, in the first box (30) (FIG. 8), (FIG. 10), the oil pressure tubes are used in the braking process, and in the second box (31) (FIG. 9B) the cable (27) (FIG. 10) is used in the process of release the brake pedal (23) (FIG. 8) in the first box (30) (FIG. 10).

On both sides of the upper part of the outer cylinder of the large gas springs as in, the brake's jaws (28) (FIG. 10) are used on each side to brake the rail track (29) (FIG. 10) that pass between them, where this rail track (29) (FIG. 10) is part of the head of the inner cylinder press as it shown in, this is when the large gas springs (8) (FIG. 4) are compressed when the middle tank (12) (FIG. 4) descends at the end of the first phase, as the brake pedal box (30) (FIG. 8), (FIG. 10) is fixed on the outer cylinder of the large gas springs as shown in, also as shown in (FIG. 12), and when the middle tank (12) (FIG. 4) at the end of the first phase descends, and pressure on the arm (21) (FIG. 8B) of the brake box, and braking the large gas springs (8) (FIG. 4), the arm (21) (FIG. 8C) remains and hold in its place; because of the braking, and this process is called: (self-braking).

Figure 6:
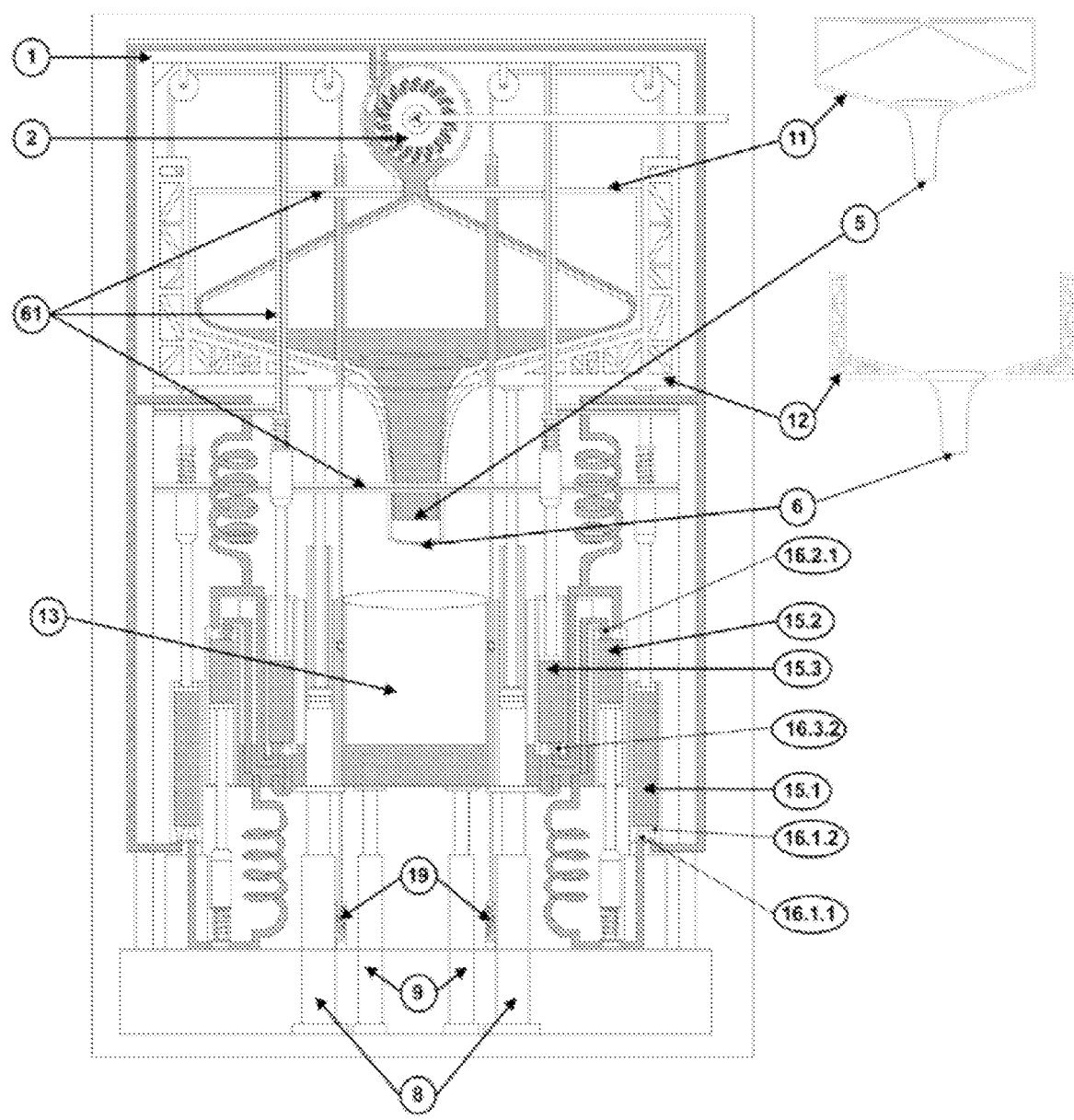
FIG. 6—The fourth phase of the machine cycle.

As for when the time becomes to release the large gas springs (8) (FIG. 6) from the brake exactly at the end of the third phase and the beginning of the fourth phase, here the second box (31) (FIG. 10), (FIG. 12) is used as in, as the cable (27) (FIG. 9B), (FIG. 10) it releases the oil pressure brakes piston rod (39) (FIG. 8E) through the brake pedal (23) (FIG. 8E), therefore, letting the brake's jaws (28) (FIG. 10) off the rail track (29) (FIG. 10) and allow the large gas springs (8) (FIG. 6) to raise the lower tank (12) (FIG. 6).

After releasing the brake pedal (23) (FIG. 8E), (FIG. 8A), it returns to its place as in by tightening it with the coil spring (55) (FIG. 8E).

In this version, the brakes boxes of the large hydraulic lift cylinders aren't needed, because hydraulic lifting cylinders do not need to be braking.

2) The automatic system for opening and closing the drain stopper of the upper tank (5) (FIG. 2) and drain stopper of the middle tank (6) (FIG. 2) as follows:

First: the process of opening and closing the drain stopper of the upper tank (5) (FIG. 2), this system relies to open the drain stopper of the tank on the brake pedal releasing box (33) (FIG. 12) fixed on the machine structure, shown in (FIG. 9A, upper tank cable (40)) and that through the movement of the rise of the lower tank (13) (FIG. 7) at the end of the fourth phase.

Figure 12:
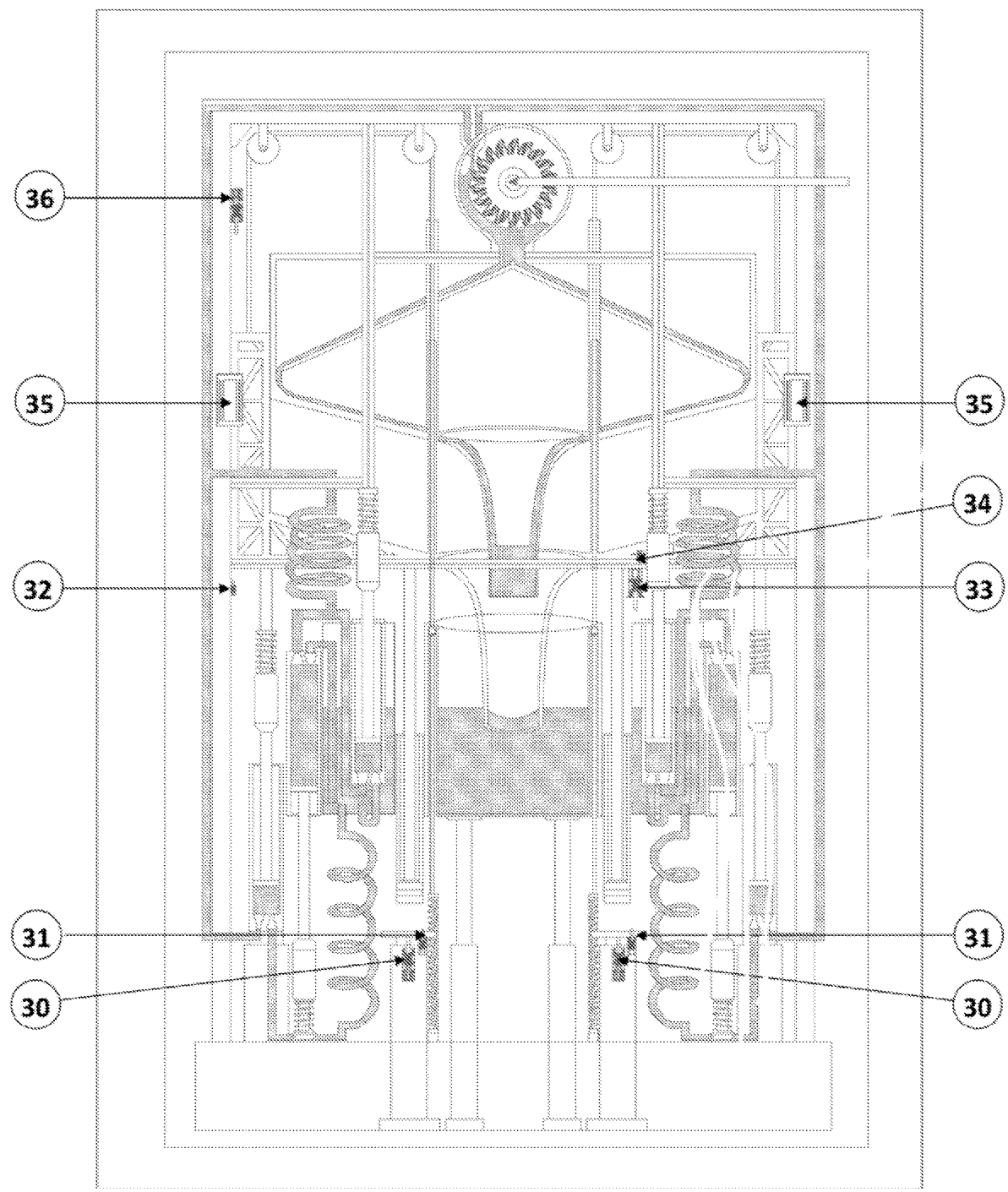
FIG. 12—Map distribution of the brakes boxes, brake pedal removal, and tank covers opening and closing.
Figure 13:
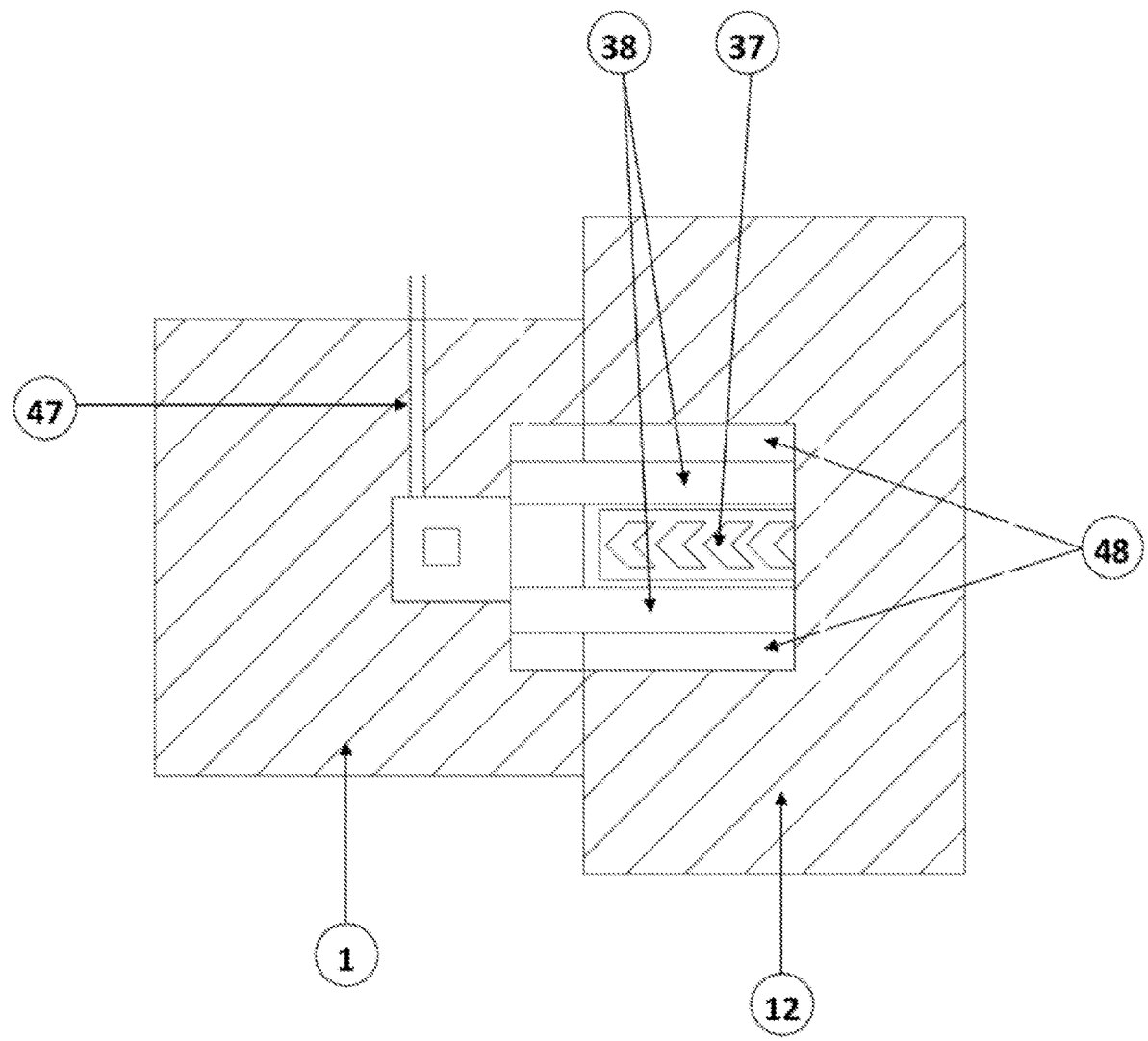
FIG. 13—Middle tank brake+hand brake.
Figure 14:
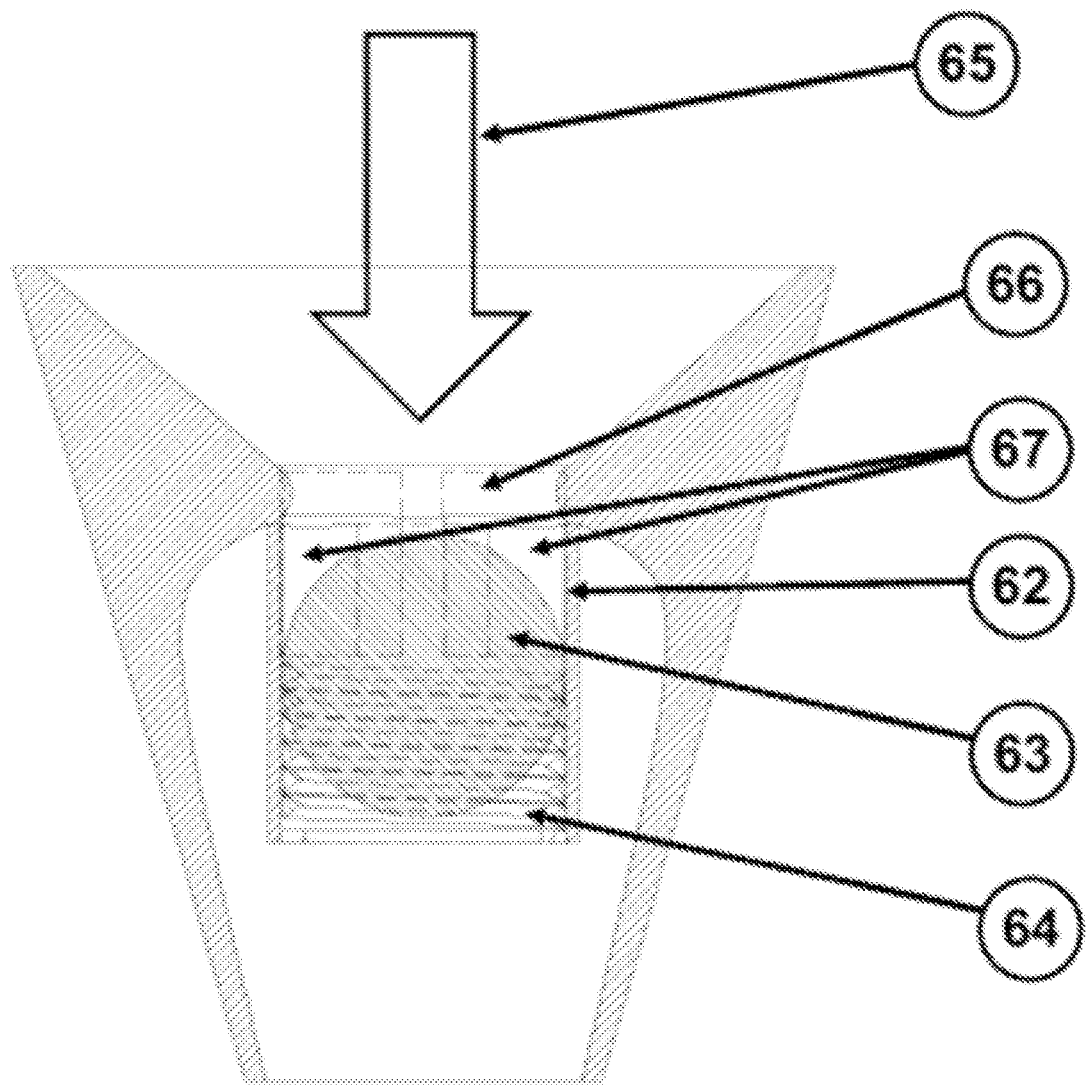
FIG. 14—One-way valve.
Figure 15:
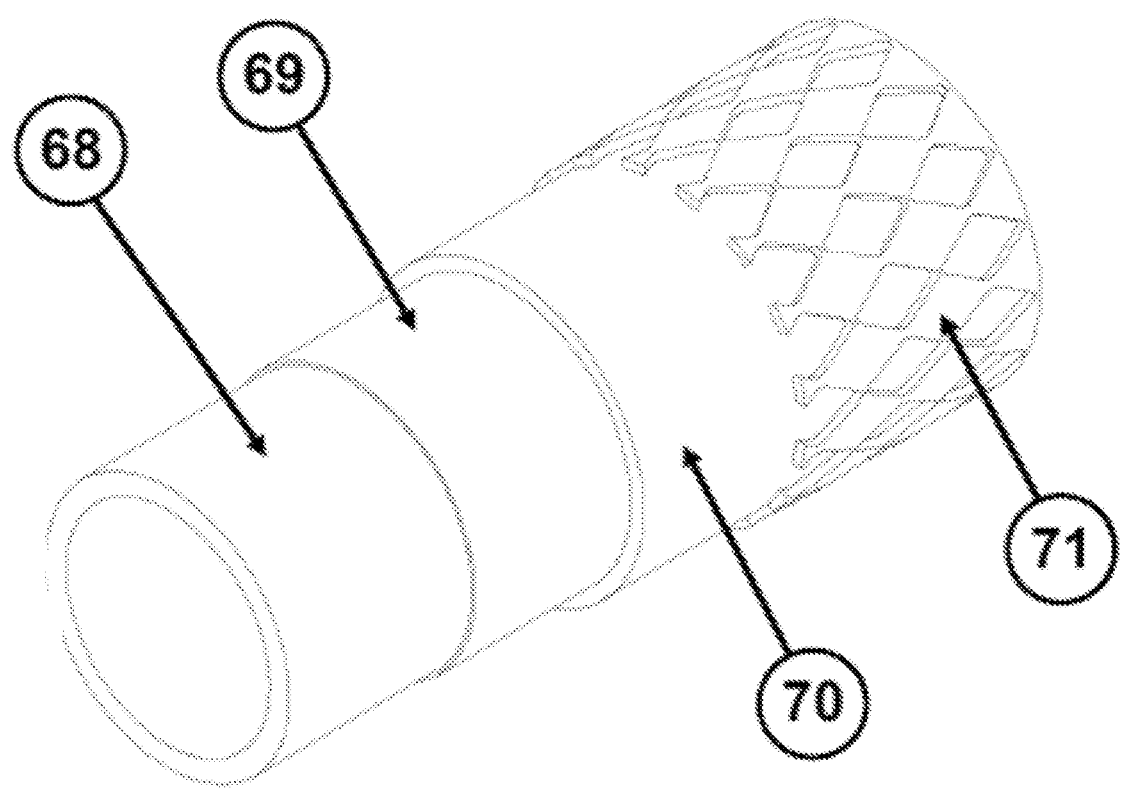
FIG. 15—Spiral water pipe layers.
Figure 16:
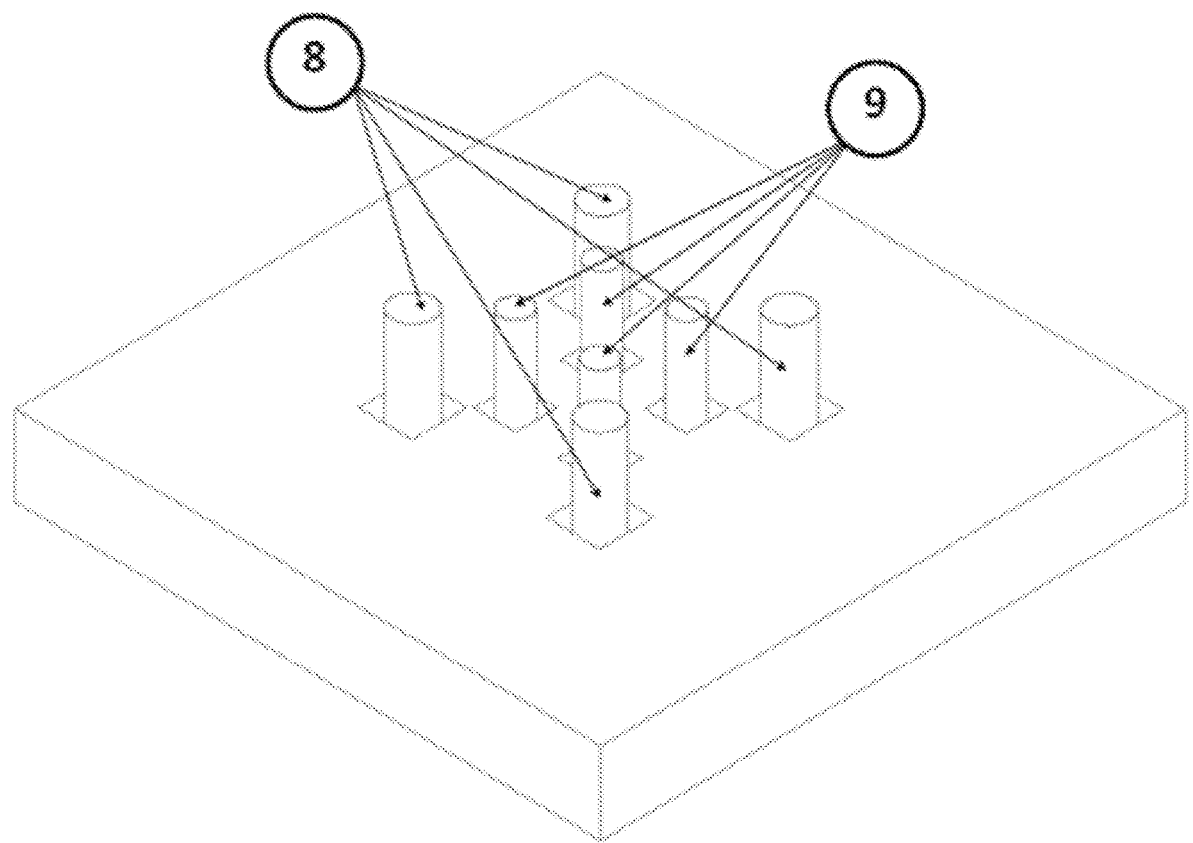
FIG. 16—Small and large gas spring distribution base.

As for the closing of the drain stopper of the upper tank (5) (FIG. 2) for this tank, this is done by the movement of the descent of the middle tank (12) (FIG. 4) at the end of the second phase, where the automatic closure system is used through box (32) (FIG. 9B, brake pedal release cable (27)) which it fixed on the machine structure (FIG. 12).

Figure 4:
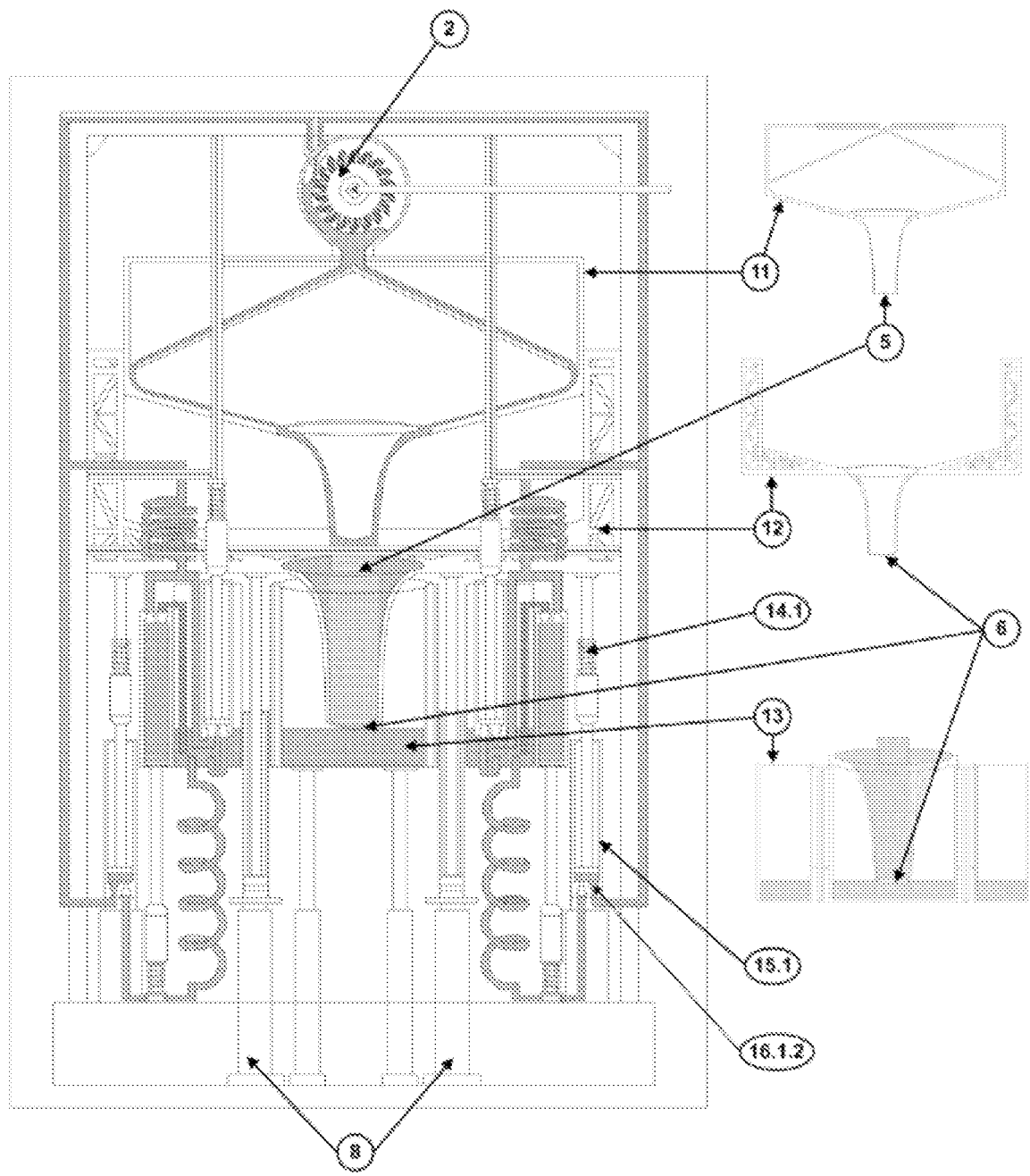
FIG. 4—The second phase of the machine cycle.

The drain stopper of the upper tank (5) (FIG. 4) closes at a slow speed fit to speed of the water emptying from the middle tank (12) (FIG. 4).

Second: The process of opening and closing the drain stopper of the middle tank (6) (FIG. 2), the drain stopper of this tank funnel is opening when the middle tank (12) (FIG. 4) descends and reaches the bottom, through the automatic opening box (FIG. 9B, brake pedal release cable (27)), fixed in the middle tank structure (34) (FIG. 12).

As for the drain stopper of the middle tank (6) (FIG. 6), this is done through the outer ring of the drain stopper of the upper tank (5) (FIG. 6), exactly when the middle tank (12) (FIG. 6) returns to the top in its place at the end of the fourth phase.

3) The Automatic system for lifting the middle tank (12) (FIG. 11):

As shown in (FIG. 11) the diagram of the automatic system, where this system depends on the steel wire rope (18) (FIG. 11), and the pulleys (17) (FIG. 11) fixed in the machine structure (1) (FIG. 11) at the top.

The steel wire rope (18) (FIG. 11) is always fixed in the middle tank (12) (FIG. 11), and it passes through the pulleys (17) (FIG. 11) fixed to the top of the machine structure (1) (FIG. 11), and it's directed down towards the base of the machine (42) (FIG. 11) through its passage in a pipe inside the tank of: {upper (43) (FIG. 11), middle (44) (FIG. 11), lower (45) (FIG. 11)}, the steel wire rope (18) (FIG. 11) is fixed to an extendable coil spring (19) (FIG. 11), and this coil spring is always fixed at the base of the machine (42) (FIG. 11) in order to keep the steel wire rope (18) (FIG. 11) tight throughout the time from the scattering and friction with the machine parts.

The process of lifting the middle tank (12) (FIG. 11) occurs automatically by the weighing of the lower tank (13) (FIG. 11) when it comes down, specifically where the steel wire rope (18) (FIG. 11) is tighten from the top of the pipe intended for the steel wire rope in the lower tank (45) (FIG. 11), in the area shown in (FIG. 11), where this steel wire (18) (FIG. 11) in this area (46) (FIG. 11) has a solid steel cylinder (20) (FIG. 11) attached and knotted to the steel wire rope (20) (FIG. 11) to let a lifting occurs between the ends of the steel wire rope (18) (FIG. 11), thus the middle tank (12) (FIG. 11) is raised.

When the lower tank reaches down, the coil spring returns with its original status position (shrunken), and when the lower tank rises again in the fourth phase it does not affect to the steel wire rope, as the coil spring stays in its status position (shrunken).

As for when the middle tank (12) (FIG. 4) comes down at the end of the first phase, here the steel wire rope (18) (FIG. 5) is tugging from the end at the base of the machine, and extension the coil spring (19) (FIG. 5), and thus the solid steel cylinder (20) (FIG. 11) returns to its position as in, and this movement of the steel wire rope (18) (FIG. 11) continues to this way.

4) In addition to the automatic systems, there is a manual braking system (35) (FIG. 13), (FIG. 12) whose task is to stop the machine, and its main task is as the first spark to operate the machine; Once the brakes (35) (FIG. 12) are manually lowered into this system, the machine begins to be running and operate.

The machine can be stop by the manual brakes system (35) (FIG. 12) at any time while the middle tank (12) (FIG. 5) is in moving; Because the brakes are on both sides of the middle tank (35) (FIG. 12), as the brakes (FIG. 13) are brakes by the oil pressure system in the tubes, and the brakes (FIG. 13) are fixed in the machine structure (1) (FIG. 13), (FIG. 2) and included in a longitudinal canal track (48) (FIG. 13) on both sides of the middle tank (12) (FIG. 13) structure as shown in (FIG. 13).

The brake system (35) (FIG. 13), (FIG. 12) does not adversely effect on the machine, and the operation of the machine can be resumed at any time once the brake is lowered again.

Part Three: Important physical calculations in the principle of machine operation as follows:

1) The momentum losing by the gas springs on average is =(20%) from the weight that compressed them, for example: (the gas spring that is compressed by 1000 kg, it can raise 800 kg), and because of the gas springs compression in two phases in the machine's cycle, The (large springs (8) (FIG. 2) in the first phase, and the small springs (9) (FIG. 2) which are 75% of the power of the large springs (8) (FIG. 2) in the third phase), thus the resultant of the thrust energy in the gas springs (the large gas springs (8) (FIG. 2) 800 kg and the small (9) (FIG. 2) 600 kg)=1400 kg, and this force inherent in the total of the large gas springs (8) (FIG. 2) and small (9) (FIG. 2) gas springs is able to raise the lower tank (13) (FIG. 6) with ease in the fourth phase, and also work by big force to push the water from the water syringes (15.3) (FIG. 6) to the water turbine (2) (FIG. 6) at the top by the amount of the remaining increase of the force of pushing and lifting the weight of the lower tank (13) (FIG. 6) as will be explaining in the next paragraph.

2) Explain the equation of the distribution of weights in the phases of the machine cycle, which the middle tank (12) (FIG. 3) and lower tanks (13) (FIG. 5) moving in the first, third and fourth phases as follows:

The First Phase.

If the weight of the water in the middle tank (12) (FIG. 3) is =4000 kg, and the weight of the tank itself=800 kg, so the total is =(4800 kg), and because the machine has four sides, then there are four water syringes (15.1) (FIG. 3) (on each side a syringe), therefore each water syringe (15.1) (FIG. 3) needs (200 kg) of weight in order to be sufficient to reach the water turbine (FIG. 3, Pt. 2) and flow on its with enough strength, so: (200 kg×4 syringes (15.1) (FIG. 3))=800 kg.

So: we subtract from the weight 4800 kg, the weight that water syringes (15.1) (FIG. 3) require, mean: (4800-800) =4000 kg.

The (weight 4000 kg), is the weight that must compress the large gas springs (8) (FIG. 3), but as mentioned earlier: "The momentum of gas springs losing an average by (20%) from the weight that compressed them", thus the weight that obtained from the momentum of the large gas springs (8) (FIG. 3)=(4000 kg−20%)=3200 kg.

The Third Phase.

At the beginning of this phase, the water has been transported from the middle tank (12) (FIG. 5) to the lower tank (13) (FIG. 5) through the first and second phase, thus the weight of the water in the lower tank (13) (FIG. 5) becomes=(4000 kg), in addition to the weight of the lower tank (13) (FIG. 5)=(800 kg), so the total summation=(4800 kg), here we subtract the weight designated for the water syringes (15.2) (FIG. 5) and because there are 4 syringes, then 200 kg×4 syringes (15.2) (FIG. 5)=800 kg, i.e. (4800-800)=4000 kg.

But here the small gas springs (9) (FIG. 5) can contain a weight: (75% from what can the large gas springs (FIG. 5, Pt. 8) contain), that's mean the small gas springs (9) (FIG. 5) need only 3000 kg, thus the aggregate amount of the weight from the obtained of the momentum gained by the small gas springs (9) (FIG. 5) is =(3000-20%)=2400 kg.

So: the total of the weight from the momentum gained by the (the large gas springs (8) (FIG. 5)) and small (9) (FIG. 5)) gas springs is =3200 kg+2400 kg=5600 kg.

That's mean: these the large gas springs ((8) (FIG. 5)+(9) (FIG. 5)) can carry a weight of (5600 kg).

As for the rise of the middle water tank (12) (FIG. 5) (empty of water) in the same phase, it will be through the weight that has been relinquished from the small gas springs (9) (FIG. 5), and its quantity is (1000 kg), therefore this weight (1000 kg) can lift the empty middle water tank (12) (FIG. 5), where its empty weight is (800 kg); Because the weight difference here is (200 kg), and this lifting process happening as shown in the second part of the detailed description of the invention.

Finally, the Fourth Phase.

At the beginning of this phase, the weight that all gas springs ((8) (FIG. 6)+(9) (FIG. 6)) must carry is: (4000 kg, water weight in the lower tank (13) (FIG. 6)+800 kg, the weight of the lower tank (13) (FIG. 6) itself)=4800 kg, so we subtract this weight from the weight that the large and small gas springs ((8) (FIG. 6)+(9) (FIG. 6)) collected to push and lifting, that's mean: (5600 kg−4800 kg)=800 kg.

And this result (800 kg) will be distributed to the water syringes (15.3) (FIG. 6) and it's 4, that means: each one has (200 kg) of weight from the pressure of the gas springs ((8) (FIG. 6)+(9) (FIG. 6)).

Always the small quantity of water at the bottom of the lower tank (13) (FIG. 3) is calculated before the water is transferred to it from the middle tank (12) (FIG. 3) from the total of the lower tank (13) (FIG. 3) itself=800 kg, as if it empty.

Figure 1B:
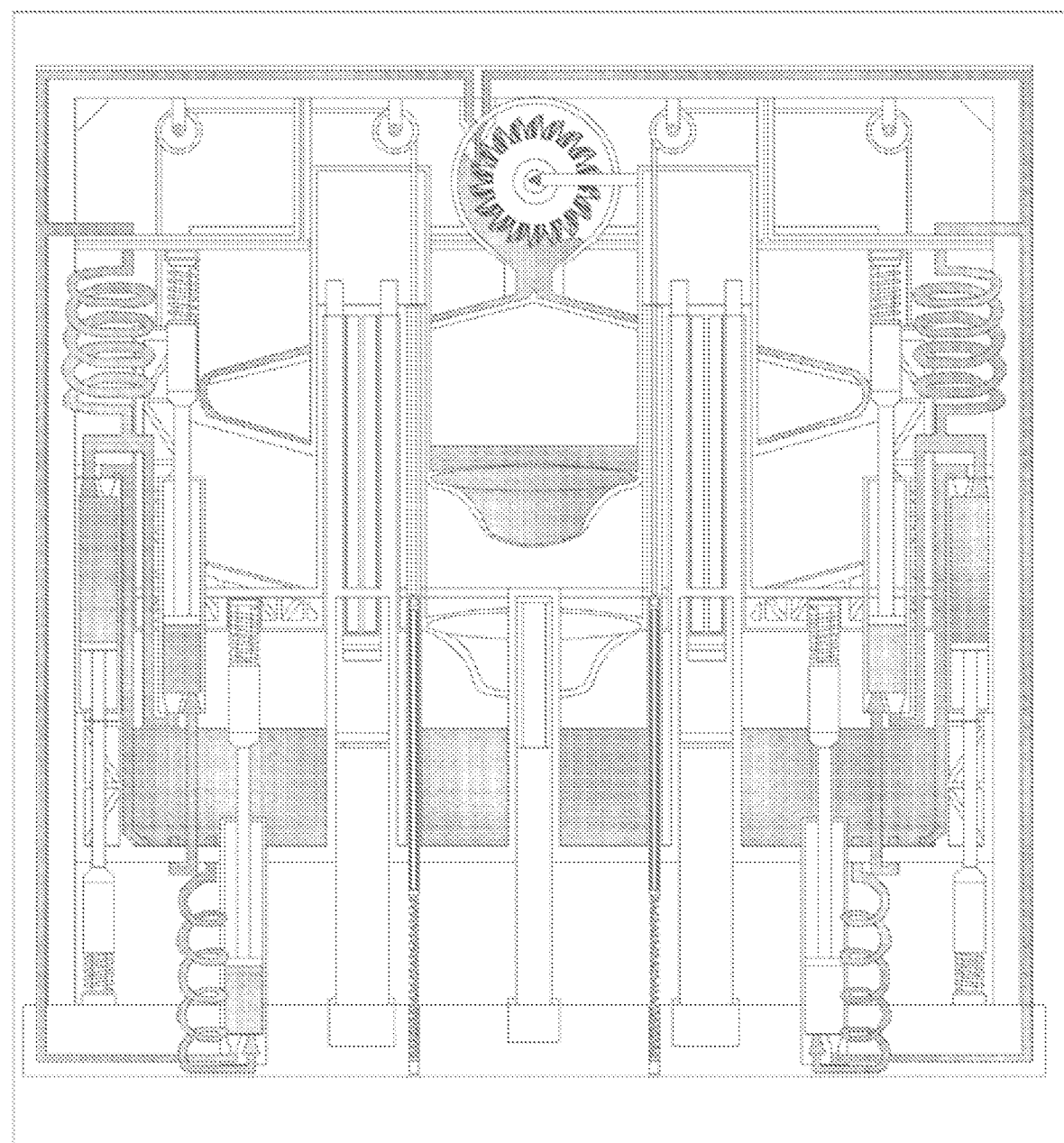

In addition to the simplified first model (FIG. 2), there are two other models for distributing machine parts and arranging them to fit the desired purpose by the size of it, as shown in (FIG. 1A) and (FIG. 1B).

What is claimed is:

1. A hydro-mechanical energy transfer system, comprising:

a housing;

a turbine assembly disposed within the housing, wherein the turbine assembly includes a turbine member disposed within a body, wherein rotation of the turbine member is selectively operable to generate kinetic energy;

a plurality of tanks disposed within the housing and aligned about a common longitudinal axis, wherein the plurality of tanks includes a fixed upper tank, a selectively moveable middle tank, and a selectively movable lower tank, wherein the upper tank is selectively operable to be at least partially received within the middle tank;

a fluid passage that permits a fluid coming down from the body of the turbine assembly to be introduced into the upper tank;

a plurality of syringes, at least one of which is in fluid communication with the turbine assembly;

wherein the middle tank is selectively operable to move away from the upper tank and towards the bottom portion of the housing when the fluid is introduced into the middle tank from the upper tank;

wherein the lower tank is selectively operable to move away from the middle tank and towards the bottom portion of the housing when the fluid is introduced into the lower tank from the middle tank;

wherein the middle tank is selectively operable to move away from the lower tank and towards the upper tank when the fluid is introduced into the lower tank from the middle tank;

wherein movement of the middle or lower tanks is selectively operable to cause rotation of the turbine member by causing at least one of the syringes to cause a fluid flow to be charged into the body of the turbine assembly.

2. The hydro-mechanical energy transfer system according to claim 1, further comprising an upper tank funnel formed on a lower portion of the upper tank and a middle tank funnel formed on a lower portion of the middle tank.

3. The hydro-mechanical energy transfer system according to claim 1, further comprising first and second drain plugs that are present in the upper tank and middle tank, respectively, which are selectively operable to open and close depending on movement of the respective tanks during a machine cycle.

4. The hydro-mechanical energy transfer system according to claim 1, further comprising a plurality of springs positioned at a lower portion of the housing.

5. The hydro-mechanical energy transfer system according to claim 4, further comprising a first piston assembly provided at a bottom portion of the middle tank and selectively operable to actuate at least one of the springs to press on at least one of the syringes.

6. The hydro-mechanical energy transfer system according to claim 5, further comprising a second piston assembly selectively operable to pump the fluid into at least one of the syringes.

7. The hydro-mechanical energy transfer system according to claim 6, further comprising a third piston assembly selectively operable to compress at least one of the syringes.

8. The hydro-mechanical energy transfer system according to claim 1, further comprising a manual braking system having channel paths longitudinally formed on both sides of the middle tank.

9. The hydro-mechanical energy transfer system according to claim 4, further comprising an automatic braking system selectively operable to stop movement of the middle tank and at least one of the springs.

10. A hydro-mechanical energy transfer system, comprising:
    a housing;
    a turbine assembly disposed within the housing, wherein the turbine assembly includes a turbine member disposed within a body, wherein rotation of the turbine member is selectively operable to generate kinetic energy;
    a plurality of tanks disposed within the housing and aligned about a common longitudinal axis, wherein the plurality of tanks includes a fixed upper tank, a selectively moveable middle tank, and a selectively movable lower tank, wherein the upper tank is selectively operable to be at least partially received within the middle tank;
    a fluid passage that permits a fluid coming down from the body of the turbine assembly to be introduced into the upper tank;
    an upper tank funnel formed on a lower portion of the upper tank and a middle tank funnel formed on a lower portion of the middle tank;
    first and second drain plugs that are present in the upper tank and middle tank, respectively, which are selectively operable to open and close depending on movement of the respective tanks during a machine cycle;
    a plurality of syringes, at least one of which is in fluid communication with the turbine assembly;
    a plurality of springs positioned at a lower portion of the housing;
    a first piston assembly provided at a bottom portion of the middle tank and selectively operable to actuate at least one of the springs to press on at least one of the syringes;
    a second piston assembly selectively operable to pump the fluid into at least one of the syringes;
    a third piston assembly selectively operable to compress at least one of the syringes;
    wherein the middle tank is selectively operable to move away from the upper tank and towards the bottom portion of the housing when the fluid is introduced into the middle tank from the upper tank;
    wherein the lower tank is selectively operable to move away from the middle tank and towards the bottom portion of the housing when the fluid is introduced into the lower tank from the middle tank;
    wherein the middle tank is selectively operable to move away from the lower tank and towards the upper tank when the fluid is introduced into the lower tank from the middle tank;
    wherein movement of the middle or lower tanks is selectively operable to cause rotation of the turbine member by causing at least one of the syringes to cause a fluid flow to be charged into the body of the turbine assembly.

11. The hydro-mechanical energy transfer system according to claim 10, further comprising a manual braking system having channel paths longitudinally formed on both sides of the middle tank.

12. The hydro-mechanical energy transfer system according to claim 10, further comprising an automatic braking system selectively operable to stop movement of the middle tank and at least one of the springs.

13. A hydro-mechanical energy transfer system, comprising:
    a housing;
    a turbine assembly disposed within the housing, wherein the turbine assembly includes a turbine member disposed within a body, wherein rotation of the turbine member is selectively operable to generate kinetic energy;
    a plurality of tanks disposed within the housing and aligned about a common longitudinal axis, wherein the plurality of tanks includes a fixed upper tank, a selectively moveable middle tank, and a selectively movable lower tank, wherein the upper tank is selectively operable to be at least partially received within the middle tank;
    a fluid passage that permits a fluid coming down from the body of the turbine assembly to be introduced into the upper tank;
    an upper tank funnel formed on a lower portion of the upper tank and a middle tank funnel formed on a lower portion of the middle tank;
    first and second drain plugs that are present in the upper tank and middle tank, respectively, which are selectively operable to open and close depending on movement of the respective tanks during a machine cycle;
    a plurality of syringes, at least one of which is in fluid communication with the turbine assembly;
    a plurality of springs positioned at a lower portion of the housing;
    a first piston assembly provided at a bottom portion of the middle tank and selectively operable to actuate at least one of the springs to press on at least one of the syringes;

a second piston assembly selectively operable to pump the fluid into at least one of the syringes;

a third piston assembly selectively operable to compress at least one of the syringes;

a manual braking system having channel paths longitudinally formed on both sides of the middle tank; and an automatic braking system selectively operable to stop movement of the middle tank and at least one of the springs;

wherein the middle tank is selectively operable to move away from the upper tank and towards the bottom portion of the housing when the fluid is introduced into the middle tank from the upper tank;

wherein the lower tank is selectively operable to move away from the middle tank and towards the bottom portion of the housing when the fluid is introduced into the lower tank from the middle tank;

wherein the middle tank is selectively operable to move away from the lower tank and towards the upper tank when the fluid is introduced into the lower tank from the middle tank;

wherein movement of the middle or lower tanks is selectively operable to cause rotation of the turbine member by causing at least one of the syringes to cause a fluid flow to be charged into the body of the turbine assembly.

* * * * *